(12) United States Patent
Sekino et al.

(10) Patent No.: US 8,360,471 B2
(45) Date of Patent: Jan. 29, 2013

(54) AIR-BAG DEVICE, AND VEHICLE OCCUPANTS LOWER LIMB PROTECTING DEVICE AND DEVICE FOR PROTECTING OCCUPANT AT THE TIME OF VEHICLE SIDE COLLISION USING THE SAME

(75) Inventors: Tadaaki Sekino, Osaka (JP); Keisuke Moritani, Osaka (JP); Koji Korechika, Toyamaken (JP); Masao Kataoka, Toyamaken (JP)

(73) Assignees: Ashimori Industry Co., Ltd., Osaka (JP); SANKO GOSEI Kabushiki Kaisha, Toyamaken (JP)

( * ) Notice: Subject to any disclaimer, the term of this patent is extended or adjusted under 35 U.S.C. 154(b) by 584 days.

(21) Appl. No.: 12/639,377

(22) Filed: Dec. 16, 2009

(65) Prior Publication Data

US 2011/0012329 A1     Jan. 20, 2011

(30) Foreign Application Priority Data

Jul. 16, 2009 (JP) ................................. 2009-167391
Nov. 12, 2009 (JP) ................................. 2009-258670

(51) Int. Cl.
*B60R 21/04* (2006.01)

(52) U.S. Cl. ..................................... 280/753; 280/730.2

(58) Field of Classification Search .............. 280/730.1, 280/730.2, 732, 736, 743.1, 753
See application file for complete search history.

(56) References Cited

U.S. PATENT DOCUMENTS

| | | | | |
|---|---|---|---|---|
| 5,536,043 | A * | 7/1996 | Lang et al. | 280/753 |
| 5,931,493 | A * | 8/1999 | Sutherland | 280/730.1 |
| 6,131,950 | A * | 10/2000 | Schroter | 280/753 |
| 6,435,554 | B1 * | 8/2002 | Feldman | 280/753 |
| 7,048,298 | B2 * | 5/2006 | Arwood et al. | 280/730.1 |
| 2006/0255580 | A1* | 11/2006 | Enders et al. | 280/752 |
| 2006/0279073 | A1* | 12/2006 | Hotta et al. | 280/730.1 |
| 2007/0200320 | A1* | 8/2007 | Keshavaraj | 280/730.1 |
| 2007/0246920 | A1* | 10/2007 | Abele et al. | 280/730.1 |
| 2010/0194081 | A1* | 8/2010 | Thomas et al. | 280/730.1 |

* cited by examiner

*Primary Examiner* — Paul N Dickson
*Assistant Examiner* — Robert A Coker
(74) *Attorney, Agent, or Firm* — Sughrue Mion, PLLC

(57) ABSTRACT

An air-bag device capable of improving degree of freedom in setting of reaction forces according to physical frames of occupants, a vehicle occupant's lower limb protecting device and a device for protecting an occupant at the time of vehicle side collision using the air-bag device. Knees of an occupant of large build whose inertia load at the time of collision is great are assuredly protected by collective energy absorbing action of the upper cylinders (121, 121) and the lower cylinders (122, 122) at the time of collision. In a case of an occupant of small build whose inertia load at the time of collision is small, loads from the upper cylinders (121, 121) and the lower cylinders (122, 122) are exerted on the occupant in appropriate proportions according to physical size of the occupant to fulfill impact absorption at the time of collision.

26 Claims, 37 Drawing Sheets

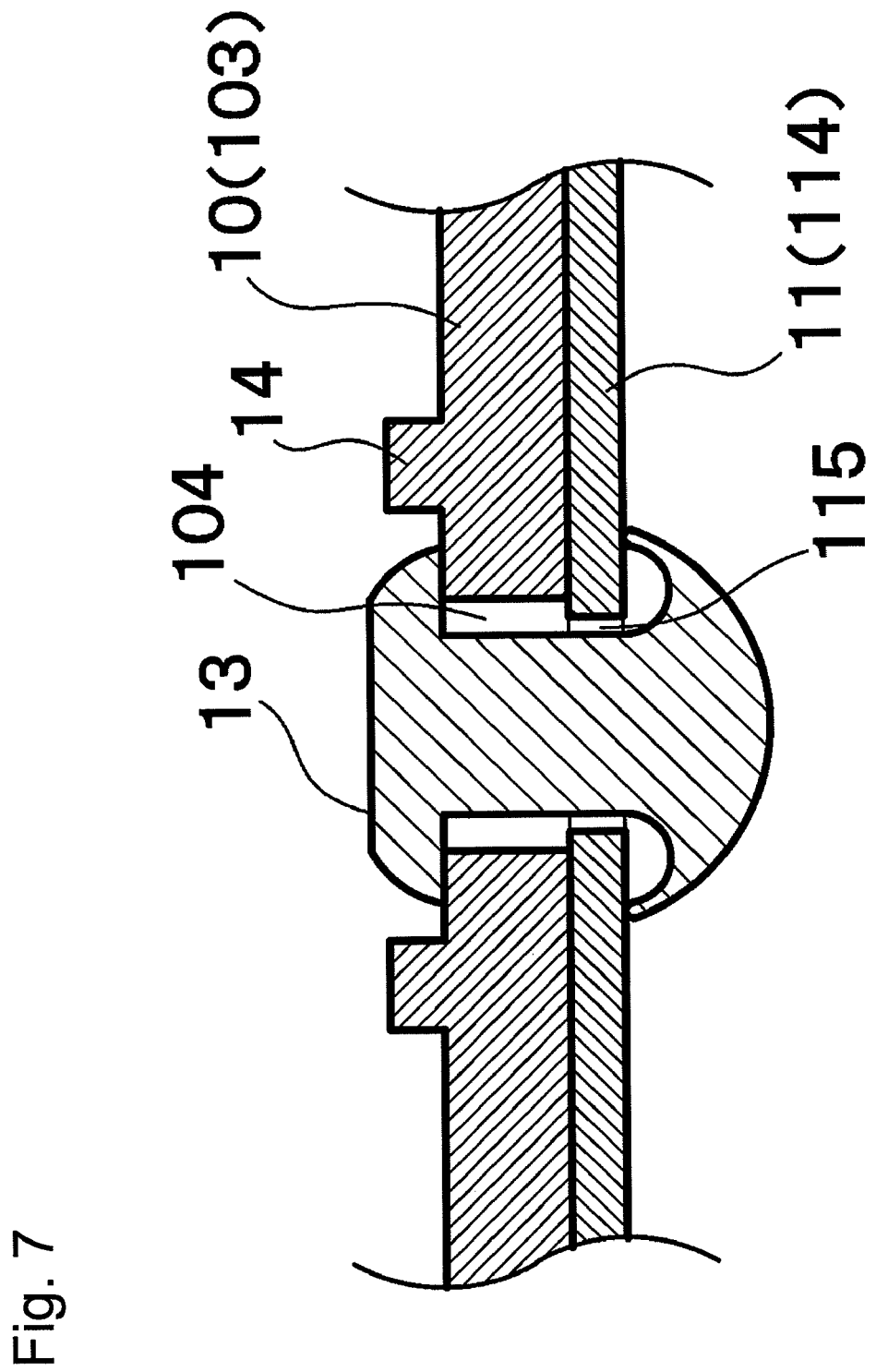

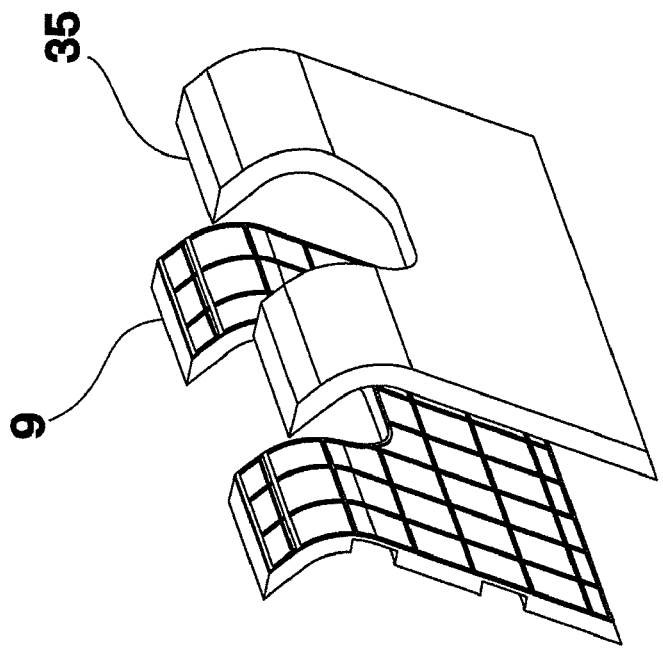
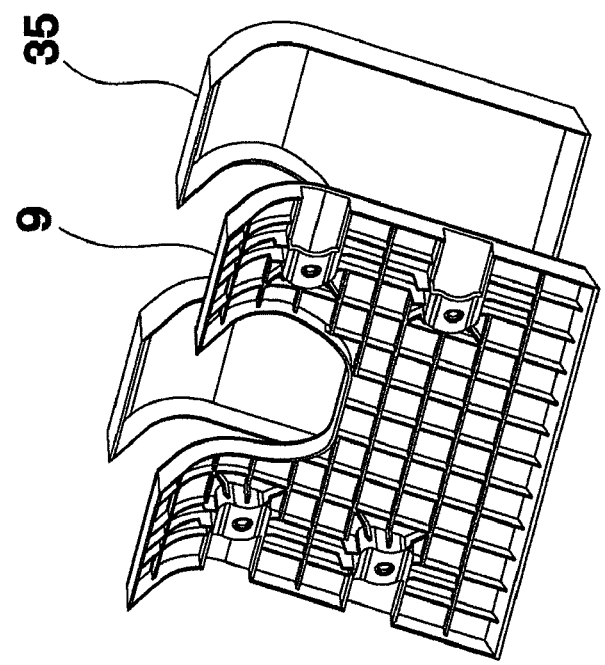

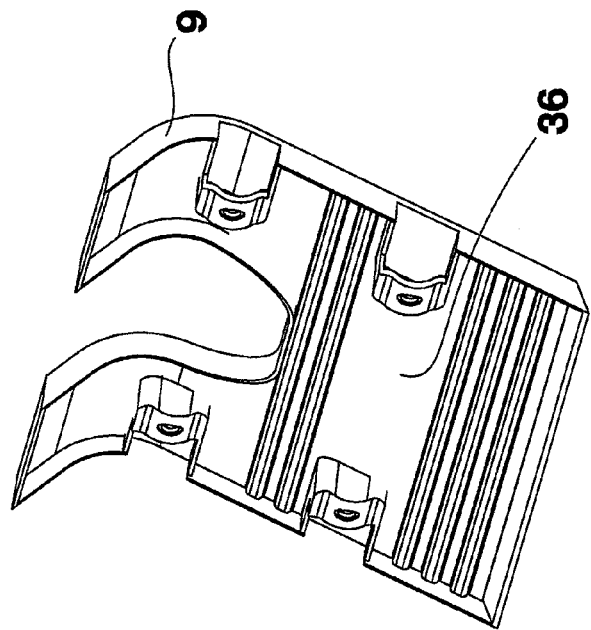
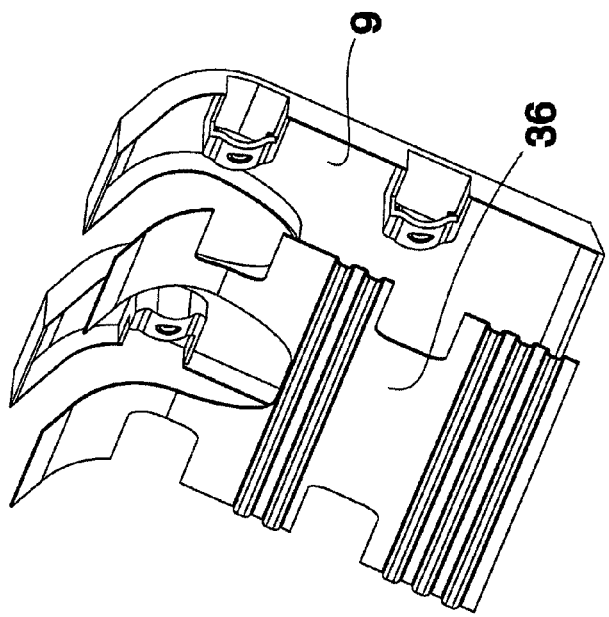

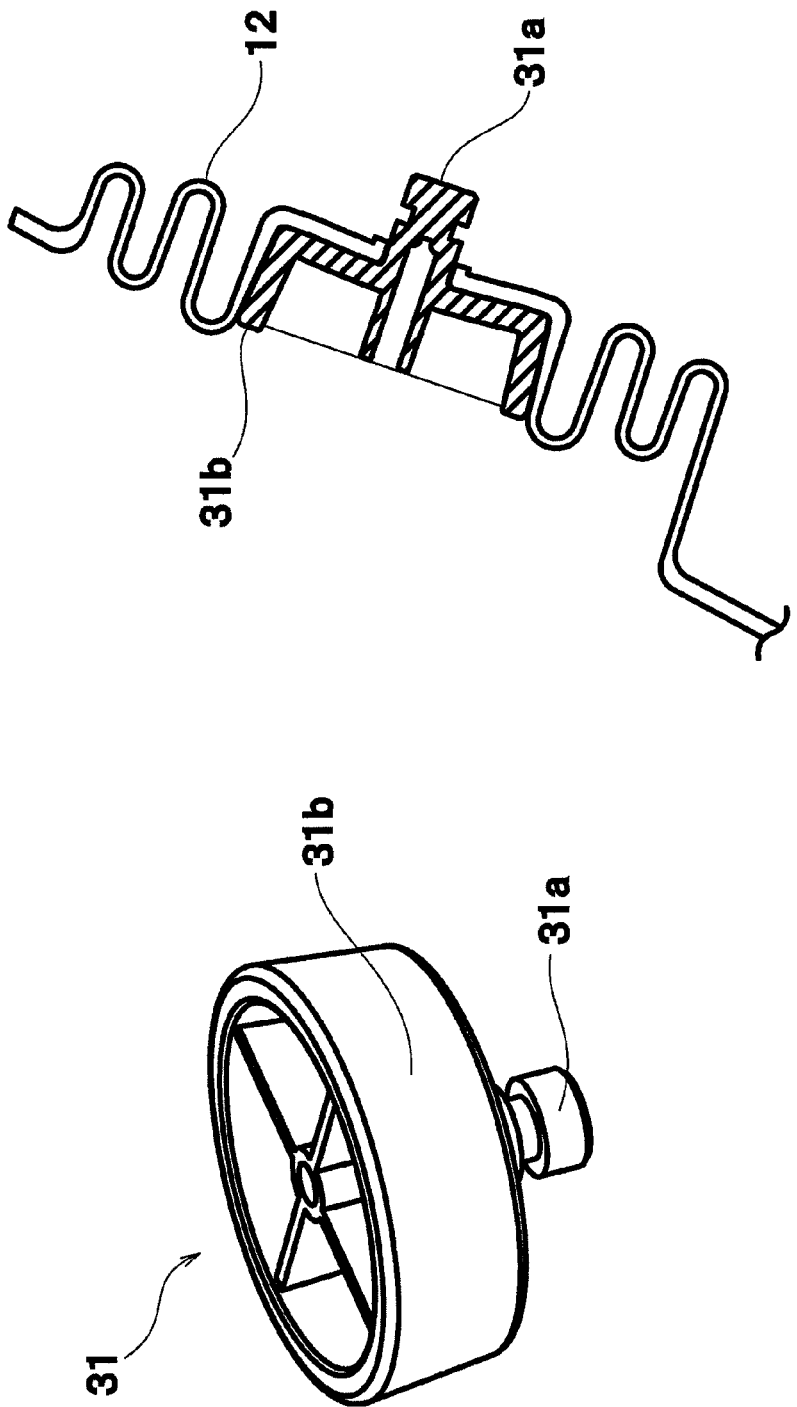

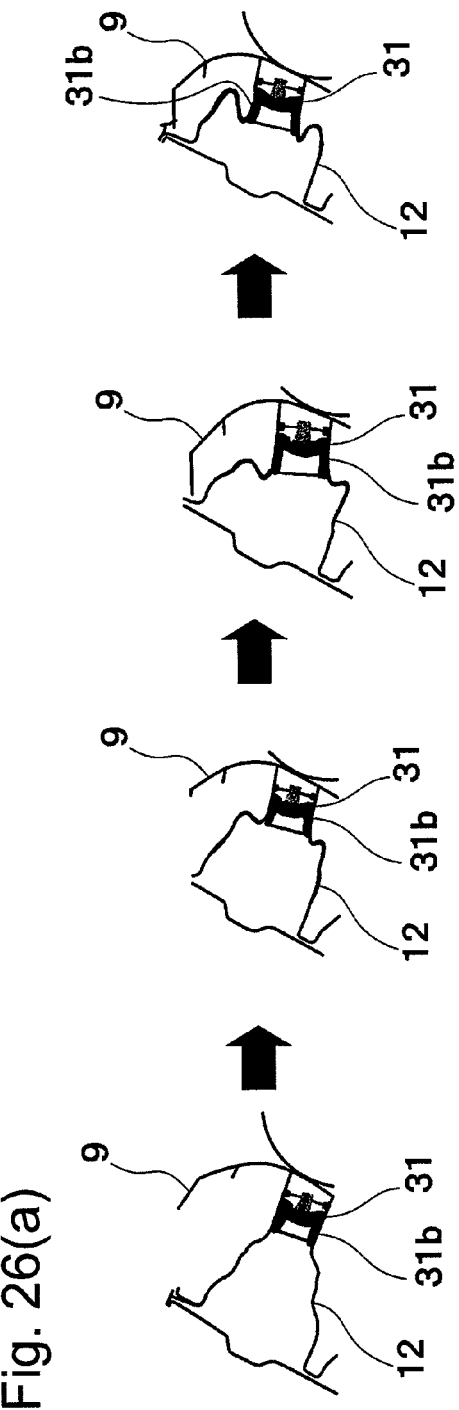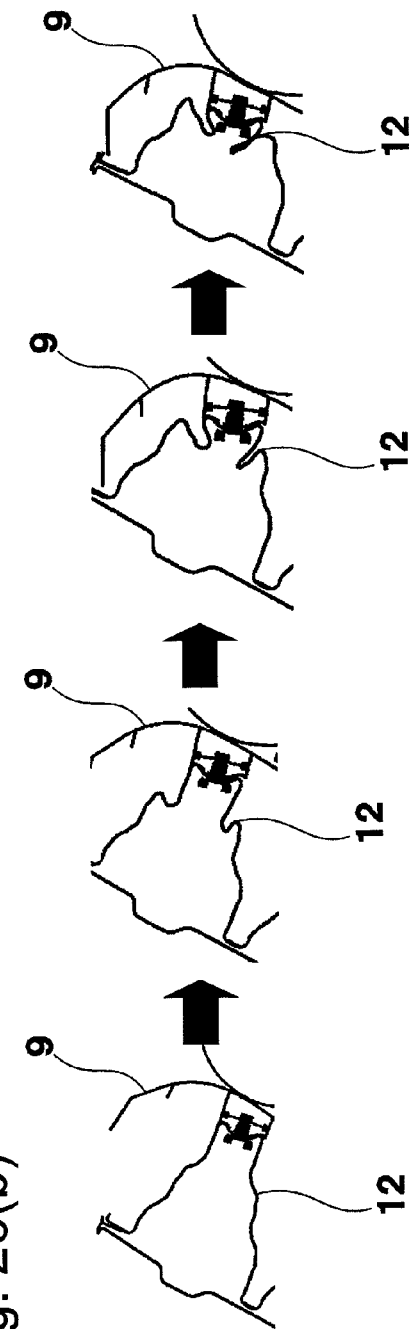

AIR-BAG DEVICE, AND VEHICLE OCCUPANTS LOWER LIMB PROTECTING DEVICE AND DEVICE FOR PROTECTING OCCUPANT AT THE TIME OF VEHICLE SIDE COLLISION USING THE SAME

BACKGROUND OF THE INVENTION

1. Technical Field

The present invention relates to an air-bag device for, at the time of vehicle collision, immediately pressing the legs of an occupant to absorb collision energy or protecting a side of an occupant, and to an occupant's lower limb protecting device for a vehicle and a device for protecting an occupant at the time of vehicle side collision wherein the air-bag device is used.

2. Background Art

Air-bag devices for vehicles generally comprise an air-bag embedded in a predetermined place in a vehicle interior (for example, a steering wheel, a panel on a passenger's seat side, or the like), an inflator for supplying high pressure gas to the air-bag, an acceleration sensor for detecting vehicle collision, and the like. At the time of vehicle collision, the inflator is ignited by an ignition signal from the acceleration sensor to generate high pressure gas, and the air-bag is thereby instantaneously expanded to prevent an occupant from dashing against the steering wheel, the panel or the like.

As such air-bags, a knee air-bag has been put to practical use which is capable of immediately holding the legs of an occupant on a front-seat (driver's seat/passenger's seat) to absorb energy.

As a knee air-bag of such a knee air-bag device, there has been a fabric knee air-bag, a plastic knee air-bag prepared by blow molding or injection molding or the like.

With respect to a fabric air-bag, since a fabric exerts tension, it is difficult to appropriately determine impact absorbing capacity for receiving knees. Accordingly, in order to optimize impact energy absorption, high development costs are required.

Further, each of these knee air-bags has such a problem that if the knee air-bag does not appropriately expand, it will dash against lower portions of legs of an occupant in the course of expansion or it will advance between knees of the occupant to cause legs of the occupant to straddle or, in a case where the occupant is of small build, it will expand in such a manner that it covers laps of the occupant to bias the laps of the occupant toward the floor of a vehicle.

As a result, the knee air-bags intended to protect the legs of an occupant adversely apply by themselves too heavy a bending load on bones below the knees, or come between the knees, push the legs apart and thereby fail to constrain the portions below knees for sufficient protection.

On the other hand, when the knees are pushed up by the impact force from the backward-going toe board, the expanded knee air-bags restrain the knees from being pushed up, thereby possibly bringing harmful consequences on the occupant such as tibia fracture, fibula fracture, ligamentous injury and the like.

With respect to a plastic knee air-bag, Patent Document 1 discloses such an automotive glove box assembly that an expansible body is connected to a gas emitting unit, and upon discharge of gas, the expansible body is pressurized and its face portion is projected to an extended position so as to constrain the lower extremities of an occupant.

Each of Patent Documents 2 and 3 discloses an inflatable knee bolster for a vehicle occupant which is mounted facing the knees of a vehicle occupant. The inflatable knee bolster is such that at least partially collapsible pleated profile elements are disposed along the sides and across the top of an expansible air-bag inner, and actuation of an inflator pressurizes the air-bag inner to cause at least a portion of the pleated profile elements to collapsibly deform in such a manner that a chamber is expanded in volume and an external face is thrust outwardly to an extended position.

PRIOR ART DOCUMENTS

Patent Documents

Patent Document 1: U.S. Pat. No. 6,758,493
Patent Document 2: U.S. Pat. No. 6,213,497
Patent Document 3: U.S. Pat. No. 6,619,689

Problems to be Solved by the Invention

If occupants have different physical frames, for example, an occupant of large build and an occupant of small build, inertia loads exerted thereon at the time of collision are different. Accordingly, the amounts of energy absorption required are different therebetween.

In each of the plastic knee air-bags disclosed in Patent Documents 1 to 3, however, if knees of occupants are pressed against different positions of an outer cover such as upper and lower positions of the outer cover due to the difference in physical frame, the plastic knee air-bag is so constructed as to uniformly receive impact force depending upon an inner pressure of the inflator.

Accordingly, with each of the plastic knee air-bags disclosed in Patent Documents 1 to 3, an appropriate energy absorption was not carried out as according to the different physical frame of occupants. In this respect, each of the plastic knee air-bags has such a drawback that reaction force is insufficient with respect to an occupant of large build and excessive with respect to an occupant of small build, and consequently, the plastic knee air-bag is not necessarily capable of obtaining good occupant protecting performance.

SUMMARY OF THE INVENTION

In view of the above problems, it is an object of the present invention to provide an air-bag device capable of improving degree of freedom in setting of reaction forces according to the different physical frame of occupants, and an vehicle occupant's lower limb protecting device and a device for protecting an occupant at the time of vehicle side collision using the air-bag device.

Means for Solving the Problems

The present invention provides an air-bag device comprising an air-bag inner, an outer cover attached to the air-bag inner, an inflator case to which the air-bag inner is attached, and an inflator for supplying a gas to a hermetically sealed space defined by the air-bag inner and the inflator case, wherein the air-bag inner is provided with a plurality of folded cylinders having their leading ends attached to the outer cover, and the outer cover is moved in the direction in which the cylinders are impact-absorbably expanded by the gas supplied from the inflator.

The inflator for supplying gas to the hermetically sealed space to expand the folded cylinders may be accommodated in the hermetically sealed space.

It is preferred that a first gas flow path for supplying gas supplied from the inflator to a cylinder or a group of cylinders and a second gas flow path for supplying gas supplied from the inflator to another cylinder or another group of cylinders be formed, and a gas flow regulating wall be formed to prevent gas from flowing from the first gas flow path into the second gas flow path until gas is permitted to flow from the first gas flow path into the second gas flow path by pressure of gas supplied from the inflator.

It is preferred that the cylinder or the group of cylinders be an upper cylinder or upper cylinders and the other cylinder or the other group of cylinders be a lower cylinder or lower cylinders, and the upper cylinder or upper cylinders be designed to expand in advance of the lower cylinder or lower cylinders.

An air-bag device preferably comprises a plurality of air-bag inners, and an inflator case having a plurality of inflator case side sections which correspond to the plurality of air-bag inners and an inflator case center section integrally formed with the plurality of inflator case side sections, wherein the plurality of air-bag inners are attached to the plurality of corresponding (respective) inflator case side sections, and the inflator case center section is attached with an inflator plate made of a metal to define a hermetically sealed space by the air-bag inners, the inflator case and the inflator plate.

It is preferred that the air-bag inners be a pair of air-bag inners, and the inflator case have a pair of inflator case side sections corresponding to the pair of air-bag inners.

The inflator may be mounted in an inflator mounting cavity formed in the inflator case center section with one end portion of the inflator protruding to the outside of the hermetically sealed space.

The air-bag device may comprise metal rings each having substantially the same shape as the contour of the air-bag inner and each having insertion holes for inserting the cylinders of each of the air-bag inners;

each of the rings being disposed in such a manner that the corresponding air-bag inner and the corresponding inflator case side section and the ring are combined together with the air-bag inner held between the inflator case side section and the ring.

It is preferred that each of the inflator case side sections be formed with a plurality of gas flow paths in communication with the cylinders, and the gas flow path formed in the inflator case center section be in communication with the gas flow paths formed in the inflator case side sections.

It is preferred that the gas flow paths formed in each of the inflator case side sections be a first gas flow path or a group of first gas flow paths in communication with a cylinder or a group of cylinders and a second gas flow path or a group of second gas flow paths in communication with another cylinder or another group of cylinders.

The first gas flow path preferably has a cross-sectional area larger than that of the second gas flow path.

Orifice plates may be interposed between the inflator case and the air-bag inner (10) or air-bag inners (10a, 10b).

The leading end of each of the cylinders may be fixedly attached to the outer cover with a plastic pin.

The plastic pin preferably has a tip and a collapse preventing wall integrally formed therewith and diameter-expanded from the base end of the tip.

The tip of the plastic pin can be fitted to an outer cover connection by applying a joint having a rotational axis to the tip of the plastic pin and fitting the rotational axis of the joint to the outer cover.

The rotational axis can be disposed such that Z direction, i.e., the axial direction thereof, is perpendicular to X and Y directions, respectively. Herein, X direction represents a traveling direction of a vehicle body provided with the air-bag device and Y direction represents the vertical direction of the vehicle body perpendicular to X direction.

In the outer cover connection, a bearing portion is formed integral with the outer cover and a stopper is provided. Thereby, the rotational axis can be disposed in a bearing formed by the bearing portion and the stopper.

The bearing for the rotational axis may be elliptical in cross section.

The outer cover may have such a laminated structure that a plastic panel is fixedly attached to a front surface of the outer cover and/or a metal plate is fixedly attached to a back surface of the outer cover.

It is preferred that a seal structure be formed in a joint area of the air-bag inner and the inflator case.

Each air-bag inner and/or the cylinders may be made of a plastic, an elastomer (TPO) or a rubber.

The cylinders are preferably made of an impact absorbing plastic showing an increase of 20% to 50% or more in elongation under an environment of −30° C.

The cylinders may be integrally formed with a body of the air-bag inner by injection molding.

The cylinders may be molded by blow molding.

The present invention provides an occupant's lower limb protecting device for a vehicle configured by disposing the outer cover of the air-bag device of the present invention on an instrument panel of a vehicle body, and setting a direction of knee position, predetermined as the knee position of an occupant sitting on a seat in a vehicle (hereinafter referred to simply as "knee position"), as the direction in which the cylinders expand impact-absorbably.

The present invention provides a device for protecting an occupant at the time of vehicle side collision configured by disposing the air-bag device of the present invention between a door and door trim of the vehicle body, and disposing the outer cover of the air bag device in the vicinity of the door trim.

Effect of the Invention

According to the air-bag device, and the vehicle occupant's lower limb protecting device and the device for protecting an occupant at the time of vehicle side collision using the air-bag device of the present invention, it is possible to increase the degree of freedom in determining reaction forces according to physical frames of occupants with simple structures.

BRIEF DESCRIPTION OF DRAWINGS

FIG. 7 is a partial sectional view of the air-bag device and the vehicle occupant's lower limb protecting device of the present invention according to another embodiment.

FIG. 22(a) is an exploded perspective view of the air-bag device of the present invention according to a fifth embodiment.

FIG. 22(b) is another exploded perspective view of the air-bag device of the present invention according to the fifth embodiment.

FIG. 23(a) is still another exploded perspective view of the air-bag device of the present invention according to the fifth embodiment.

FIG. 23(b) is a further exploded perspective view of the air-bag device of the present invention according to the fifth embodiment.

FIG. 25(a) is a perspective view of the air-bag device of the present invention according to the sixth embodiment.

FIG. 25(b) is a partial sectional view of the air-bag device of the present invention according to the sixth embodiment.

FIG. 26(a) and FIG. 26(b) are illustrative views illustrating operation of the air-bag device of the present invention according to the sixth embodiment.

DESCRIPTION OF REFERENCE NUMERALS

Figure 1:
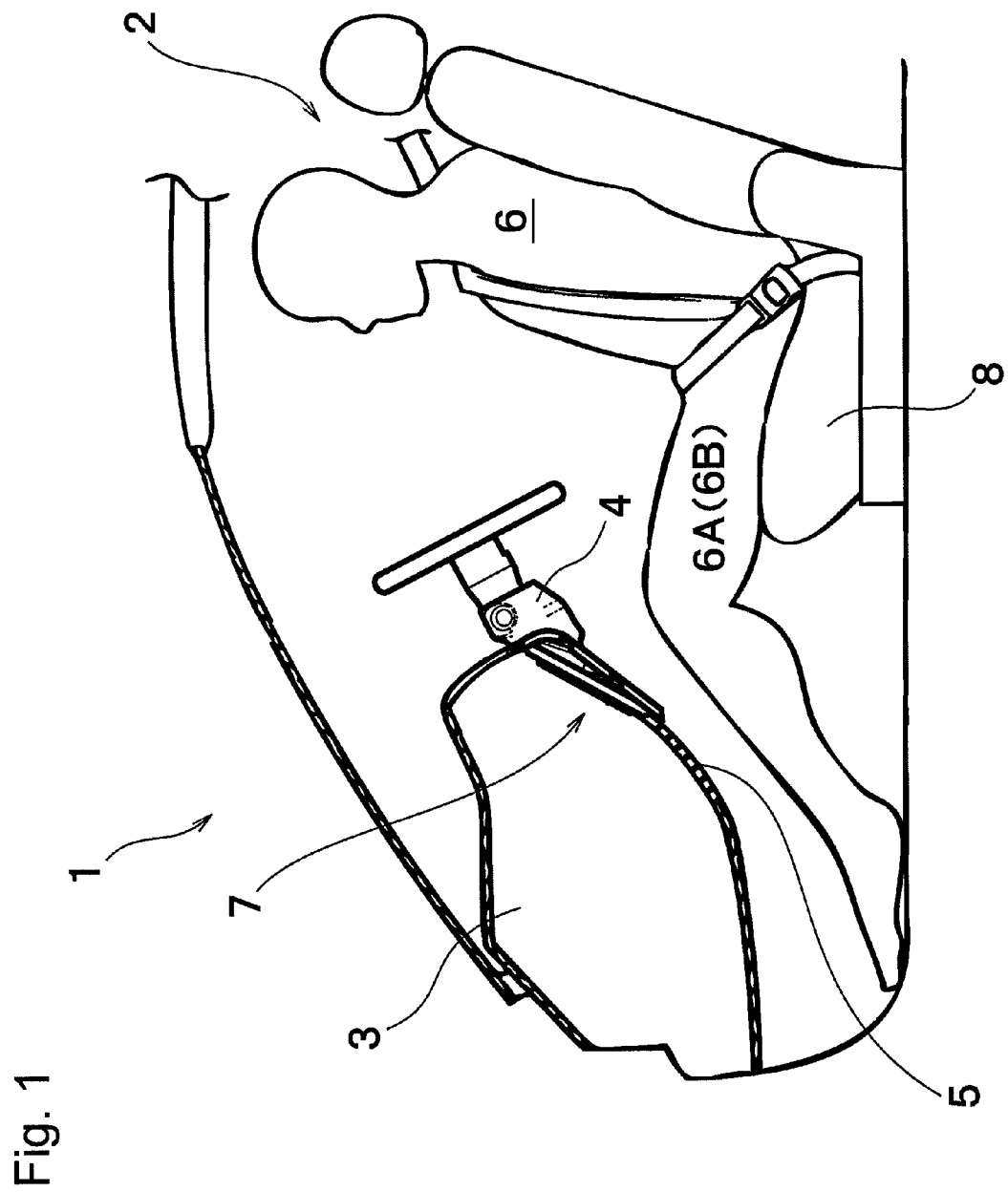
FIG. 1 is a partially cutaway sectional view showing an air-bag device and an vehicle occupant's lower limb protecting device of the present invention according to a first embodiment installed in a vehicle.

Reference numerals used to identify structural features shown in the drawings include the following.

1: vehicle body
2: driver's seat
3: instrument panel
4: steering column
7: air-bag device 9: outer cover
91: outer cover recess
10: air-bag inner
101: air-bag inner recess
102: rim
103: air-bag inner surface
104: rivet hole
11: inflator case
111: inflator case recess
112: rim
113: inflator mounting cavity
114: step
115: rivet hole
12: cylinder
121: upper cylinder
122: lower cylinder
16: inflator accommodating cavity
17: first gas flow path
18: second gas flow path
19: gas flow regulating wall
20: collision energy absorbing pleats
15: inflator
25: linear protrusion
26: groove
201: door
202: inner panel
203: door trim
37: connection

DETAILED DESCRIPTION OF THE PREFERRED
EMBODIMENTS

Next, an embodiment of the present invention will be described in greater detail with reference to the drawings. However, the present invention should not be construed as being limited thereto.

In the following, descriptions will be given on an air-bag device of the present invention according to the first embodiment and a vehicle occupant's lower limb protecting device which uses the air-bag device with reference to FIGS. 1 to 13.

Figure 2A:
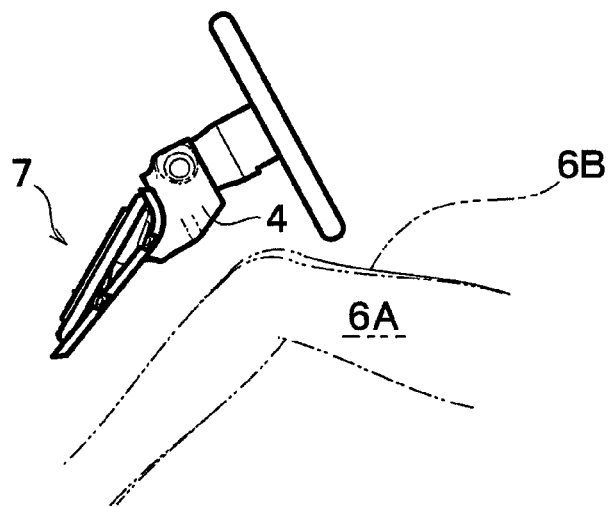
FIG. 2(a) is a partial side view showing the air-bag device and the vehicle occupant's lower limb protecting device of the present invention according to the first embodiment, which are in installed and pre-operation state and positions of legs of an occupant.
Figure 2B:
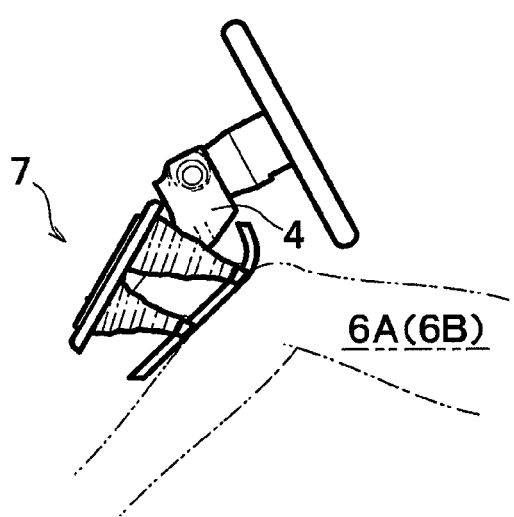
FIG. 2(b) is a partial side view showing operation of the air-bag device and the vehicle occupant's lower limb protecting device of the present invention according to the first embodiment in post-operation state and the positions of the legs the occupant.
Figure 3A:
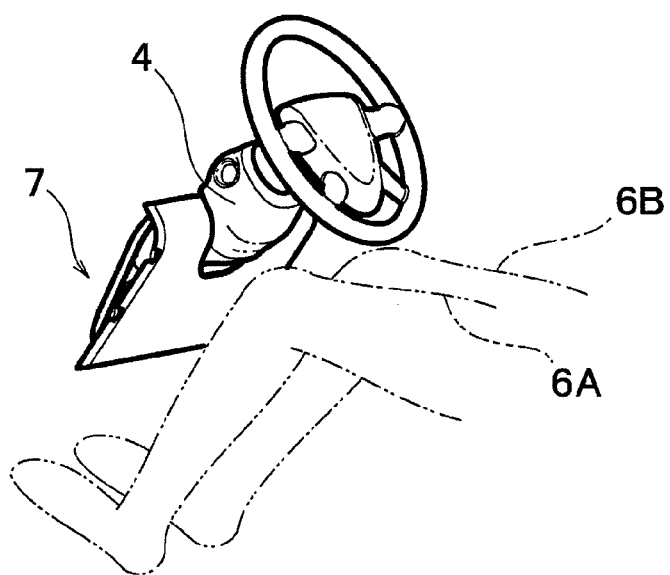
FIG. 3(a) is a partial perspective view showing the air-bag device and the vehicle occupant's lower limb protecting device of the present invention according to the first embodiment, which are installed in a vehicle and in pre-operation state and positions of legs of an occupant.
Figure 3B:
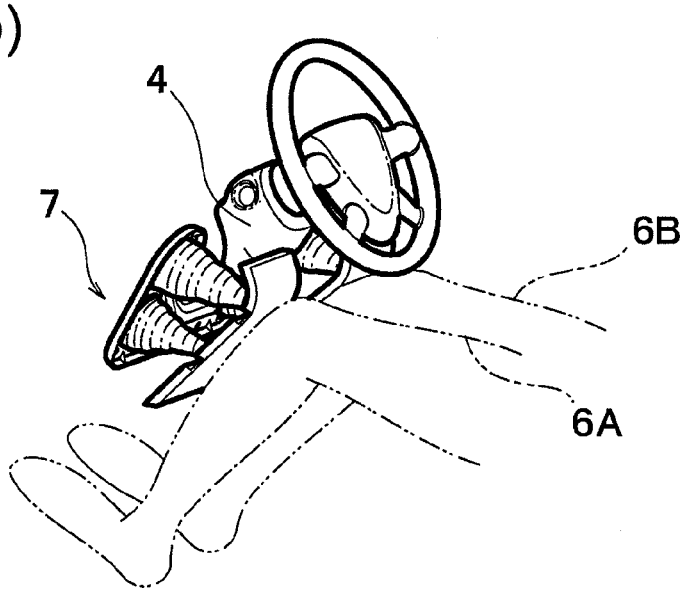
FIG. 3(b) is a partial perspective view showing operation of the air-bag device and the vehicle occupant's lower limb protecting device of the present invention according to the first embodiment, which are in post-operation state and the positions of the legs the occupant.
Figure 4:
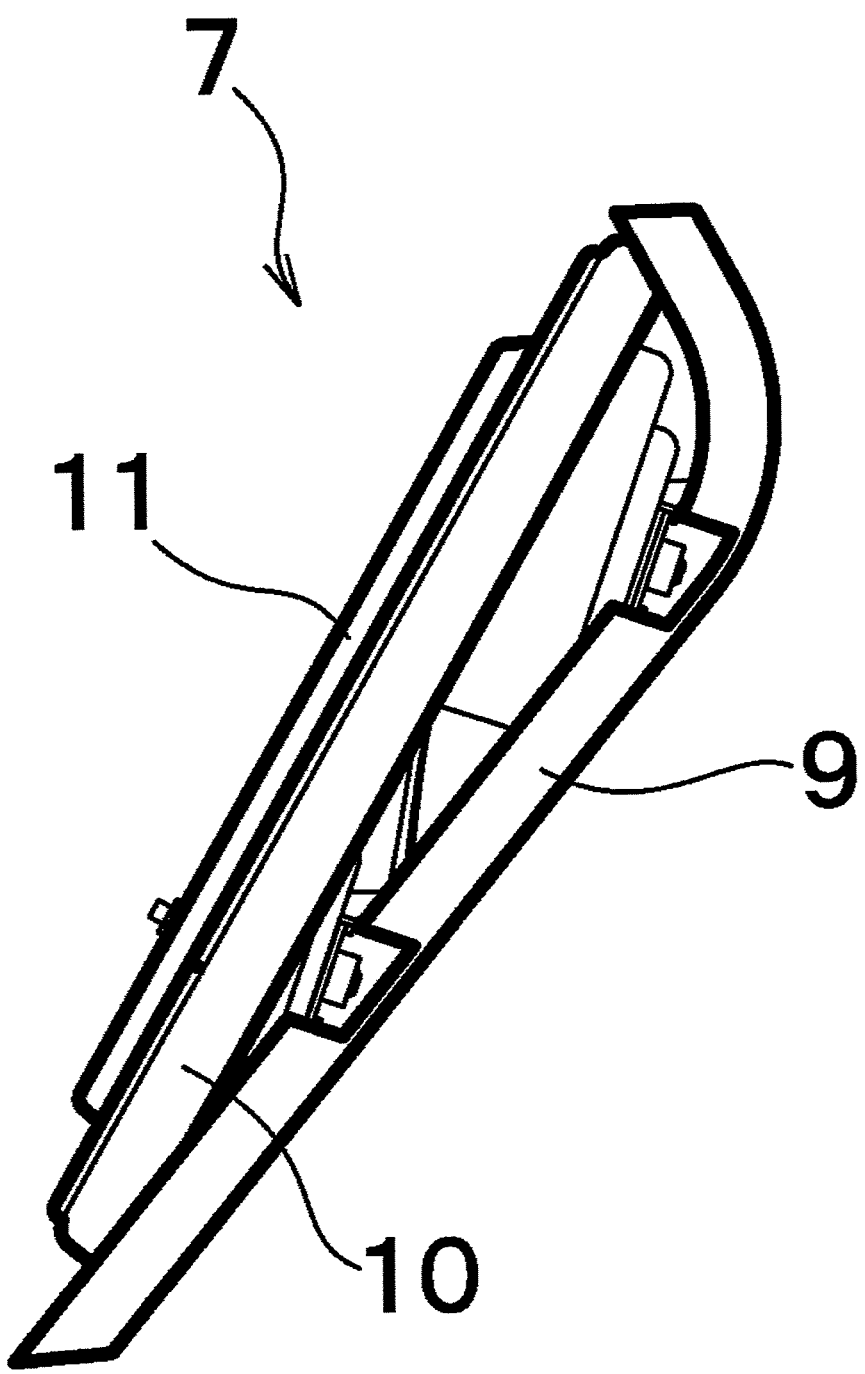
FIG. 4 is a side view of the air-bag device of the present invention according to the first embodiment.
Figure 5A:
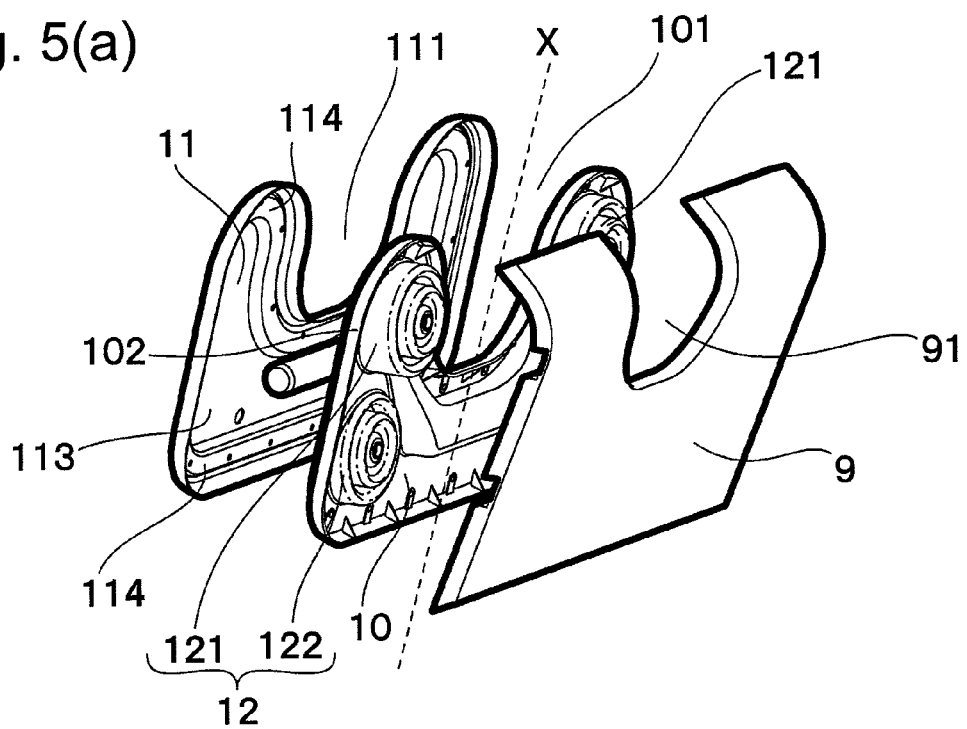
FIG. 5(a) is an exploded perspective view of the air-bag device of the present invention according to the first embodiment.
Figure 5B:
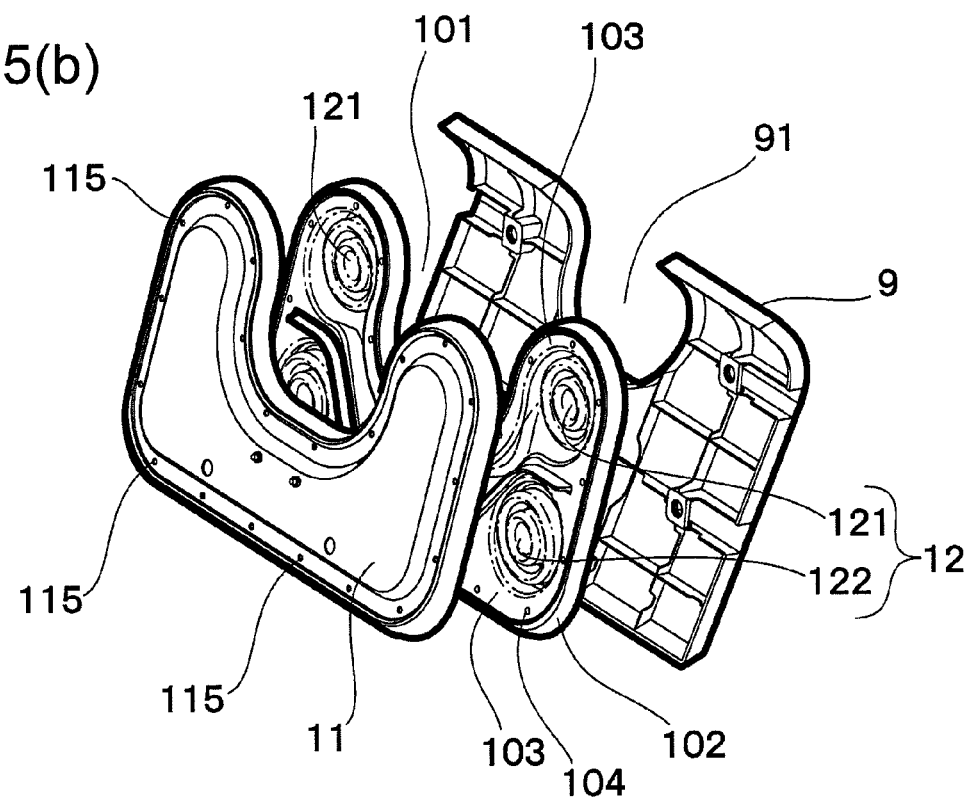
FIG. 5(b) is another exploded perspective view of the air-bag device of the present invention according to the first embodiment.
Figure 6A:
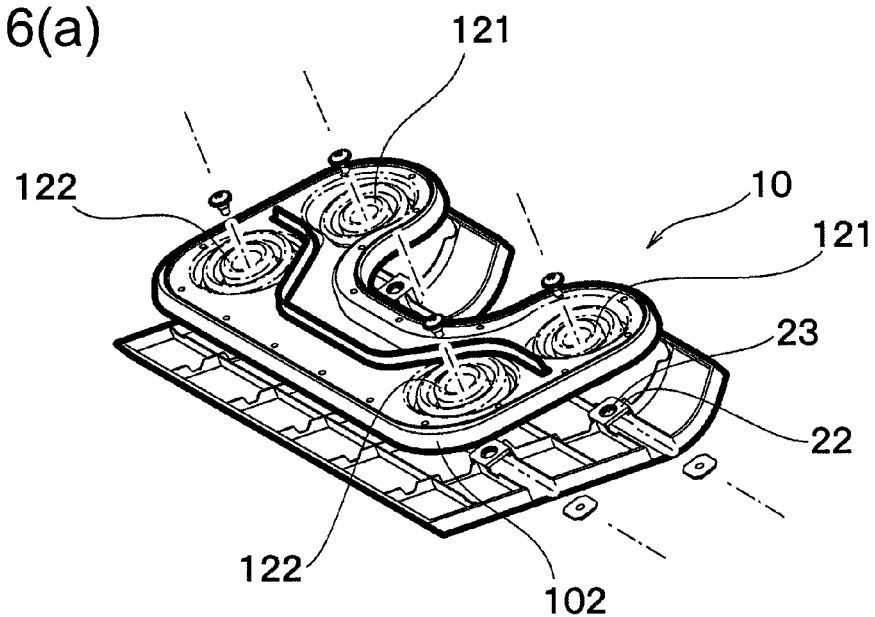
FIG. 6(a) is still another exploded perspective view of the air-bag device of the present invention according to the first embodiment.
Figure 6B:
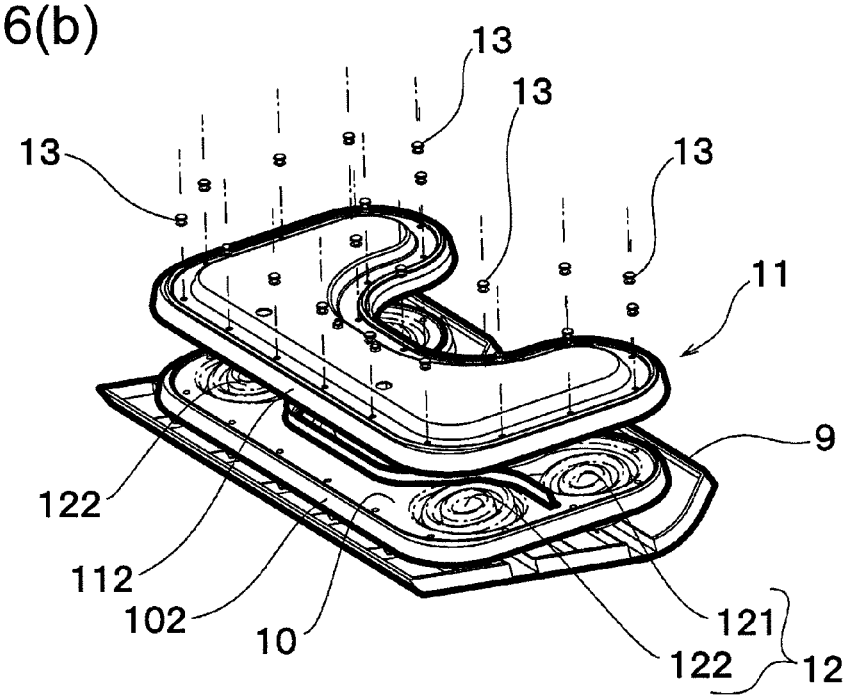
FIG. 6(b) is a further exploded perspective view of the air-bag device of the present invention according to the first embodiment.

As shown in FIGS. 1 to 3, a vehicle body 1 has an instrument panel 3 in front of a driver's seat 2. In a driver's seat 2-proximate portion, of the instrument panel 3, an opening (not shown) is formed for insertion of a steering column 4 therethrough. The steering column 4 is inserted through the opening so that it is placed in an inclining posture.

A face panel 5 of the instrument panel 3 is located in front of left and right knees 6A, 6B of an occupant 6 sitting on the driver's seat 2. The instrument panel 3 is provided with an air-bag device 7 therein. The air-bag device 7 is disposed partially around and adjacent to the steering column 4 and above and in front of a seat cushion 8 of the driver's seat 2. Accordingly, when the occupant 6 sitting on the driver's seat 2 takes a driving posture, knees of the left and right legs 6A, 6B of the occupant 6 are so located as to face the air-bag device 7.

As shown in FIGS. 4 to 7, the air-bag device 7 is formed in a roughly plate-like shape and comprises an outer cover 9 which is made of a plastic and of which upper portions are so curved that its outer surfaces of the upper portions conform to the face panel 5 of the instrument panel 3, an air-bag inner 10 which is attached to the outer cover 9 and which is also made of a plastic, and an inflator case 11 which is attached to the air-bag inner 10 and which is made of a metal. An air-bag of the air-bag device 7 is defined by the air-bag inner 10 and the inflator case 11. The face panel 5 of the instrument panel 3 and the outer surface of the outer cover 9 form a substantially smooth continuous surface.

In this connection, along the periphery of the outer cover 9, a thin-walled fragile zone (not shown) is formed. When the air-bag device 7 is actuated, the fragile zone is broken. In consequence, the outer cover 9 is separated from the face panel 5 to protrude to a position where it holds the left and right legs 6A, 6B of the occupant 6.

The outer cover 9, the air-bag inner 10 and the inflator case 11 of the air-bag device 7 have nearly square contours which are so conformable to each other that they can be assembled together. The outer cover 9, the air-bag inner 10 and the inflator case 11 are respectively formed with an outer cover recess 91, an air-bag inner recess 101 and the inflator case recess 111 for insertion of the steering column 4 in such a manner that each of them 9 to 11 is partially cut away from one side of the square-like contour to substantially the center thereof. The air-bag device 7, which is constructed by assembling the outer cover 9, the air-bag inner 10 and the inflator case 11 together, is located partially around and adjacent to the steering column 4 with the steering column 4 inserted through the outer cover recess 91, the air-bag inner recess 101 and the inflator case recess 111.

The air-bag inner 10 made of a plastic has a plurality of cylinders (in this embodiment, four cylinders) 12, 12 integrally formed therewith. Of the four cylinders 12, 12, a pair of upper cylinders 121, 121 which are located on respective sides of the air-bag inner recess 101 are provided at line-symmetric positions relative to the center line X of the air-bag inner recess 101. Further, a pair of lower cylinders 122, 122 are provided at line-symmetric positions relative to the extension of the center line X of the air-bag inner recess 101.

The air-bag inner 10 is further formed integrally with a rim 102 along the periphery of its square-like body. The rim 102 is formed such that the periphery of the square-like body of the air-bag inner 10 is bent. The edge of the rim 102 faces the outer cover 9 when the air-bag inner 10 is combined with the outer cover 9.

Likewise, the inflator case 11 is formed integrally with a rim 112 along the periphery of its square-like body. The rim 112 is formed such that the periphery of the square-like body of the inflator case 11 is bent. The edge of the rim 112 faces the air-bag inner 10 when the inflator case 11 is combined with the air-bag inner 10.

The outer surface of the rim 102 of the air-bag inner 10 and the inner surface of the rim 112 of the inflator case 11 substantially conform to each other. Accordingly, the rim 102 of the air-bag inner 10 made of a plastic may be fitted into the rim 112 of the inflator case 11 made of a metal with the rim 102 deformed within its elastic or plastic deformation limit.

In the vicinity of the periphery of an air-bag inner surface 103 of the air-bag inner 10 which is the inside when the air-bag inner 10 and the inflator case 11 are combined together with the rim 102 of the air-bag inner 10 fitted in the rim 112 of the inflator case 11, a number of rivet holes 104, 104 are formed through the air-bag inner 10 along the rim 102.

On the other hand, an air-bag inner surface of the inflator case 11, which is the inside when the air-bag inner 10 and the inflator case 11 are combined together with the rim 102 of the air-bag inner 10 fitted in the rim 112 of the inflator case 11, is formed with an inflator mounting cavity 113 in such a manner that the cavity is concave in the direction opposite to the protruding direction of the rim 112. Between the inflator mounting cavity 113 and the rim 112, a step 114 is formed. In other words, the inflator mounting cavity 113 has a shape similar to the contours of the air-bag inner 10 and the inflator case 11 when viewed in plan, and the step 114 is formed around the inflator mounting cavity 113. In the step 114, a number of rivet holes 115, 115 are formed along the rim 112.

The rivet holes 104, 104 and the rivet holes 115, 115 are formed at one-to-one corresponding positions, respectively. Accordingly, when the air-bag inner surface 103 and the step 114 are brought in direct contact with each other to combine the air-bag inner 10 with the inflator case 11, the rivet holes 104, 104 formed in the air-bag inner surface 103 and the rivet holes 115, 115 formed in the step 114 are aligned in respectively one-to-one corresponding relationship, and thus a number of pairs of the aligned rivet holes 104 and 115 are formed along the rim 102 and the rim 112. Accordingly, rivets 13, 13 are inserted though the pairs of the aligned rivet holes 104 and 115 to thereby rivet the air-bag inner 10 and the inflator case 11 together along the peripheries of the air-bag inner 10 and the inflator case 11.

When the air-bag inner 10 and the inflator case 11 are riveted together to combine the air-bag inner 10 with the inflator case 11, the outer surface of the rim 102 of the air-bag inner 10 and the inner surface of the rim 112 of the inflator case 11 are brought in air-tight contact with each other, and the air-bag inner surface 103 of the air-bag inner 10 and the step 114 of the inflator case 11 are brought in air-tight abutment on each other. Accordingly, the inner space between the air-bag inner 10 and inflator case 11 is kept hermetic.

Around the rivet holes 104, 104 formed in the air-bag inner surface 103, for example, ribs 14 formed integrally with the air-bag inner surface 103 may be provided, as shown in FIG. 7. By providing the ribs 14 in this manner, toughness of portions surrounding the rivet holes 104, 104 is improved to ensure attachment of the air-bag inner 10 and the inflator case 11 to each other and air-tightness of the inner space therebetween.

Figure 8:
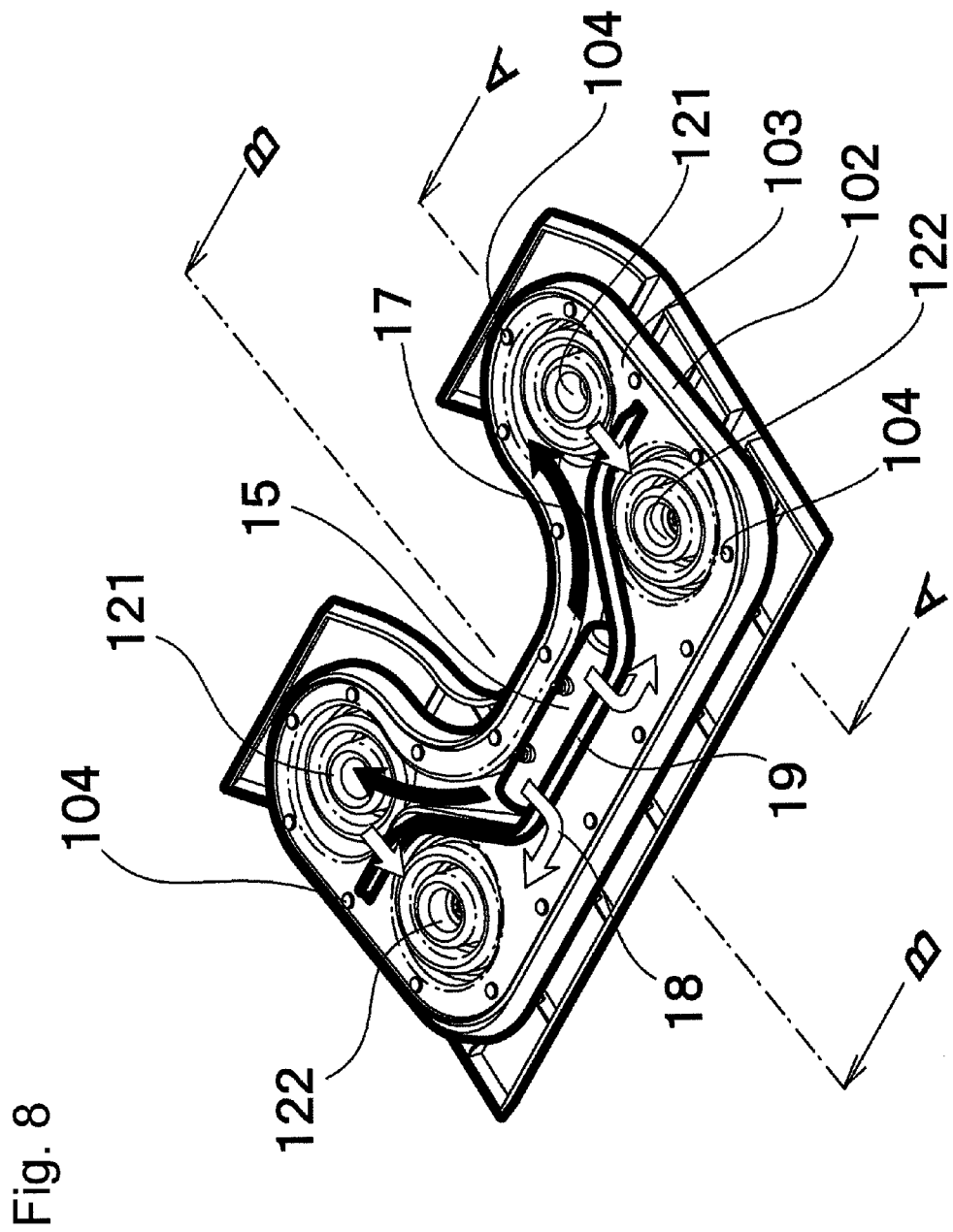
FIG. 8 is an exploded perspective view of the air-bag device of the present invention according to the first embodiment.
Figure 9:
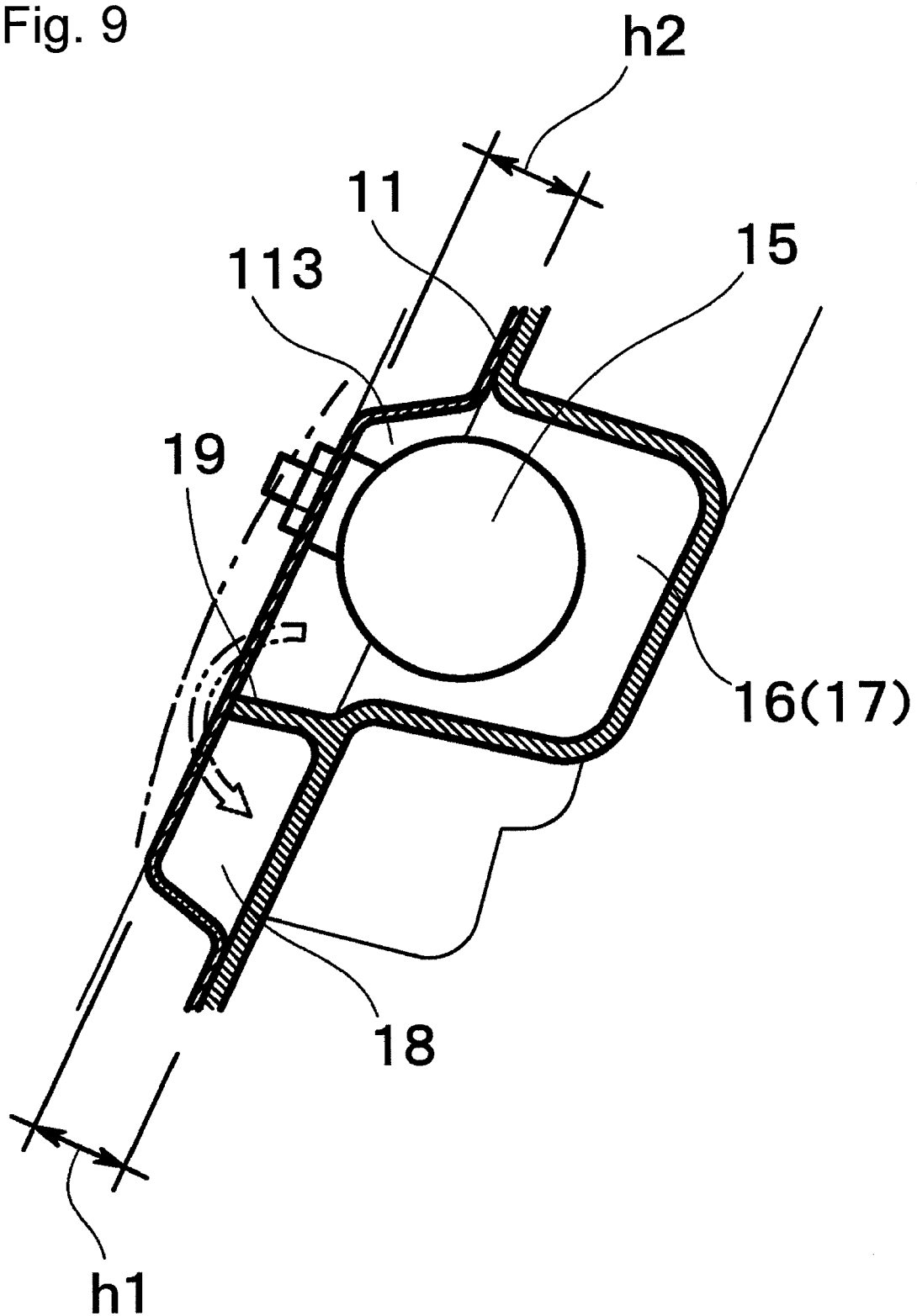
FIG. 9 is a sectional view taken along line B-B in FIG. 8.

As shown in FIGS. 8 and 9, in the air-bag inner surface 103 of the air-bag inner 10, an inflator accommodating cavity 16 for accommodating an inflator 15 is formed in such a manner that a portion in the vicinity of the bottom of the air-bag inner recess 101 is depressed. The inflator accommodating cavity 16 is extended to the both sides along the air-bag inner recess 101 to form a first gas flow path 17 in the form of a concave zone detouring around the air-bag inner recess 101 and extending between the upper cylinders 121, 121. On the other hand, a portion of the air-bag inner surface 103 between the lower cylinders 122, 122 defines a second gas flow path 18.

The air-bag inner surface 103 is provided with a gas flow regulating wall 19 standing therefrom and extending along the first gas flow path 17. The gas flow regulating wall 19 is formed between opposite walls of the rim 102 in such a manner that it extends with its one end continuous with one of the opposite walls of the rim 102 and its the other end continuous with the other of the opposite walls of the rim 102. The distance (h1) between the upper end of the gas flow regulating wall 19 and the air-bag inner surface 103 is equal to or slightly greater than the distance (h2) between the bottom of the inflator mounting cavity 113 of the inflator case 11 and the upper surface of the step 14.

Accordingly, when the air-bag inner 10 and the inflator case 11 are riveted to combine the air-bag inner 10 with the inflator case 11, the gas flow regulating wall 19 is located in the inflator mounting cavity 113 with its upper end in contact with the bottom of the inflator mounting cavity 113 while being undeformed or deformed within its elastic or plastic deformation limit. In consequence, the first gas flow path 17 and the second gas flow path 18 are not in gas flow communication with each other under normal conditions.

Figure 10A:
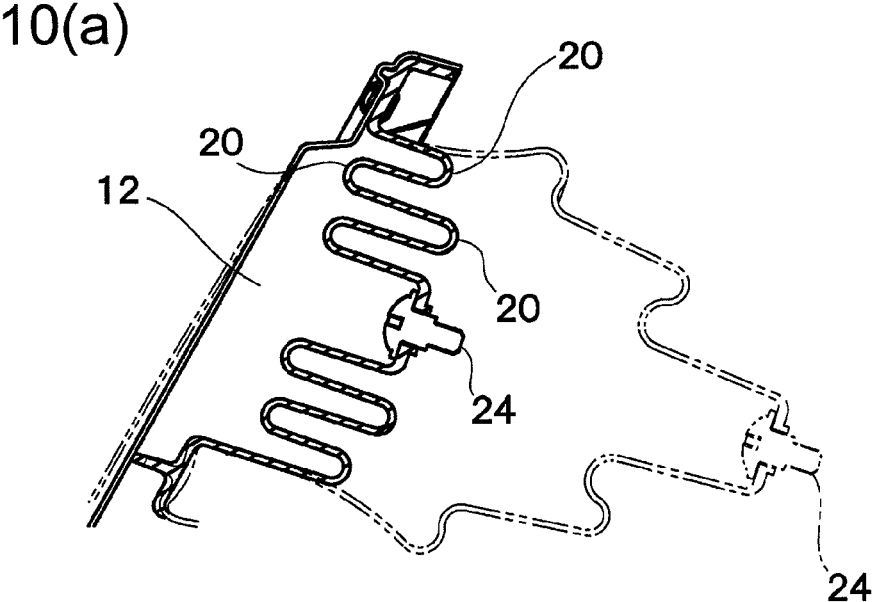
FIG. 10(a) is a sectional view taken along line A-A in FIG. 8.
Figure 10B:
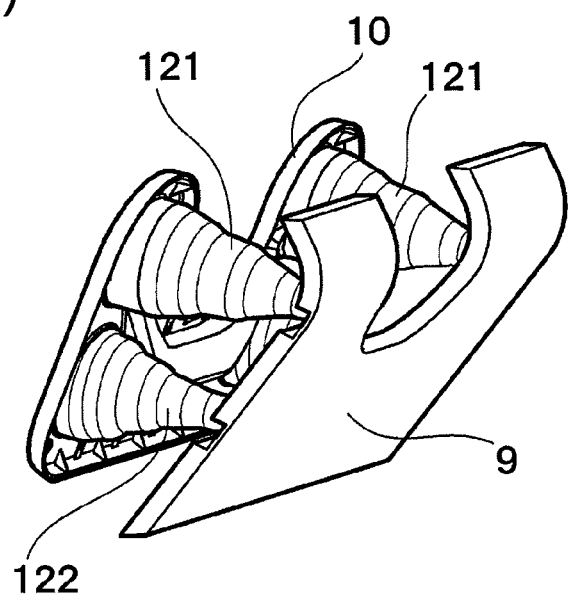
FIG. 10(b) is a perspective view showing operation of the air-bag device of the present invention according to the first embodiment.

As shown in FIG. 10, each of the four cylinders 12, 12 is folded to have a plurality of collision energy absorbing pleats 20, 20 under normal conditions. The four cylinders 12, 12 are disposed in such a manner that one cylinder 12 is disposed in an unexpanded stand-by state in each of the ends of the first and second gas flow paths 17, 18 of the air-bag inner 10.

However, each of the four cylinder 12, 12 develops a cylindrical contour when the plurality of collision energy absorbing pleats 20 are brought from the folded state to expanded state. In this embodiment, the external shape of the cylinder is a shape of a paraboloidal surface as a curved surface formed by rotating a parabolic curve as a locus which parabolic motion of an object depicts about its symmetry axis. In other words, the cylinder 12 has a circular cross-section of which diameter is the maximum at the base end of the cylinder 12 where the cylinder 12 is integrally continuous with the body of the air-bag inner 10 and becomes smaller toward the leading end. The leading end of the cylinder 12 has a hemispherical tip surface. In the hemispherical leading end of each of the four cylinders 12, 12, an insertion hole 21 is formed.

Each of the cylinders 12, 12 may have its wall thickness changed in whole or in part to thereby appropriately adjust its energy absorption characteristics. Accordingly, specifications may be set appropriately.

The shape of each of the cylinders 12 in extended state may appropriately be determined in relation to required energy absorption characteristics.

Figure 11A:
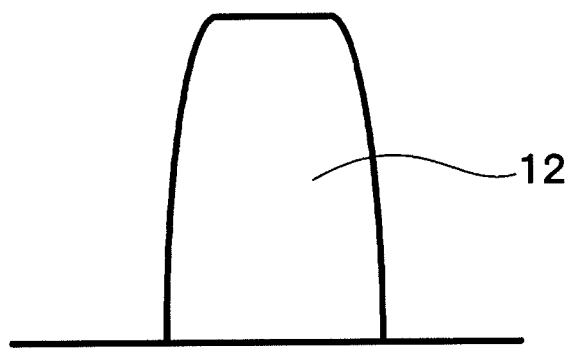
FIG. 11(a)-FIG. 11(c) are schematic views showing various shapes of a cylinder of the air-bag device according to the present invention.
Figure 11B:
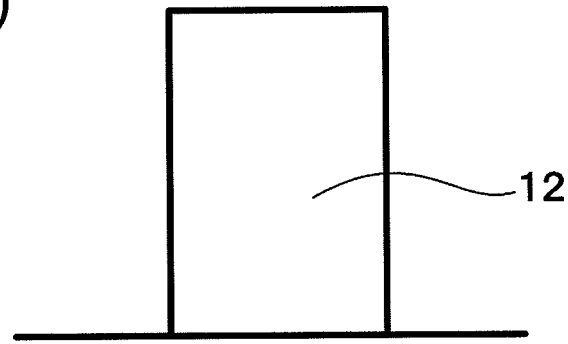
Figure 11C:
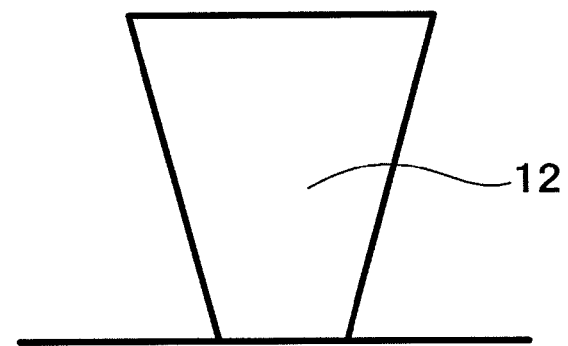

In other words, in this embodiment, the external shape of each of the cylinders 12, 12 is a shape of a paraboloidal surface, as shown in FIG. 11(*a*). In other embodiments, the external shape of the each of the cylinders 12 in expanded state may be a shape of a right cylinder as shown in FIG. 11(*b*) or may be a shape of a circular truncated cone expanding toward the leading end as shown in FIG. 11(*c*).

The air-bag inner 10 provided with the cylinders 12, 12 is made of an impact absorbing plastic. The air-bag 10 may be integrally formed as a whole including the cylinders 12, 12 by injection molding which comprises injecting an impact absorbing plastic fluidized by heating into a mold, and cooling the impact absorbing plastic in the mold.

Polymer alloys prepared by reactive blending of a nylon (PA) with a reactive polyolefin (for example, PEGMA) are known as an impact absorbing plastic. This impact absorbing plastic is characterized by deforming under a constant stress at a certain level or lower to absorb collision energy and thus its necking stress is constant. Further, the impact absorbing plastic has such characteristics that it does not harden but rather softens if it is subjected to a high speed collision. In other words, the impact absorbing plastic behaves as a softer material at a higher deformation rate and shows a higher breaking elongation (Eb) at a higher tension rate (see Polyfile 2006 No. 4, page 28 "Novel Nylon Alloy: NOVA a plastic which becomes softer when deformed at a higher rate").

With respect to this impact absorbing plastic, according to a report on an impact test where using a cylindrical specimen of 50 mm in outer diameter, 150 mm in length and 2 mm in wall thickness as a sample having a shape of an impact absorbing part of an automobile, a weight was dropped on the cylindrical specimen at a high speed under such conditions that a load was 193 kg, a collision speed was 11.3 km/hr and an collision energy was 945 J, the impact absorbing plastic (specimen) was flexibly deformed as if bellows had been collapsed, thereby showing that it is capable of absorbing a large amount of energy while maintaining a maximum point load low (see Plastic Age, 2007, vol. 53, September, page 70 "Characteristics and Applications of an Impact Absorbing Plastic").

Figure 12:
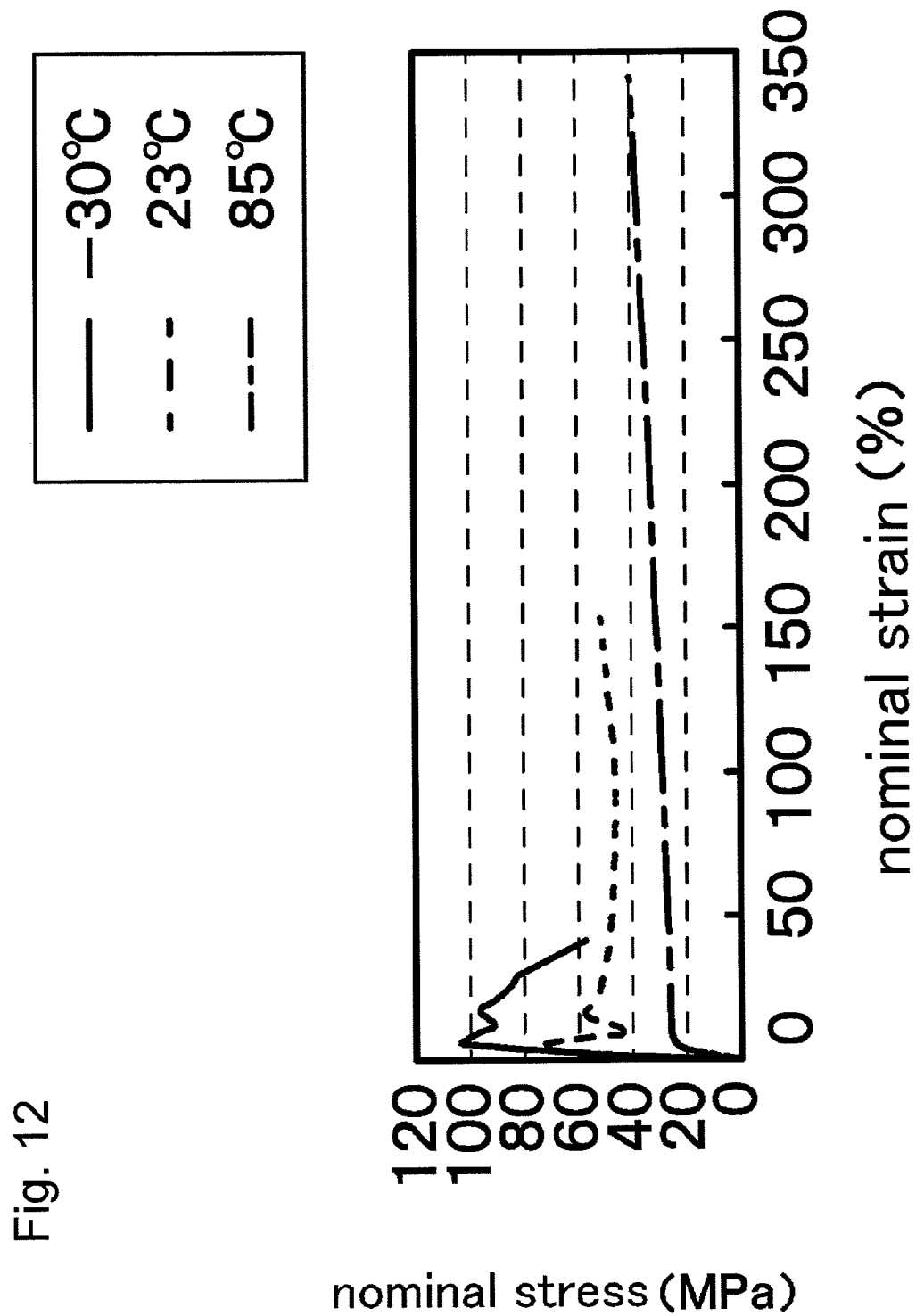
FIG. 12 is a graphical representation of nominal stress-strain curves showing results of high speed tensile test carried out at various temperatures on an impact absorbing plastic.
Figure 13A:
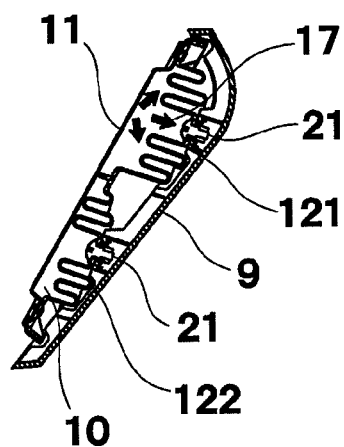
FIG. 13(a) a sectional view taken along line A-A in FIG. 8 and showing initiation phase of the operation of the air-bag device of the present invention according to the first embodiment.
Figure 13B:
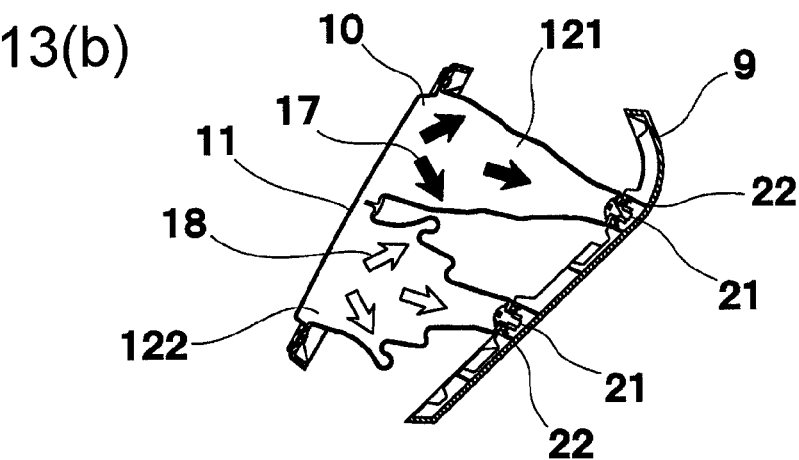
FIG. 13(b) is a sectional view taken along line A-A in FIG. 8 and showing an intermediate phase between the initiation and completion of the operation of the air-bag device of the present invention according to the first embodiment.
Figure 13C:
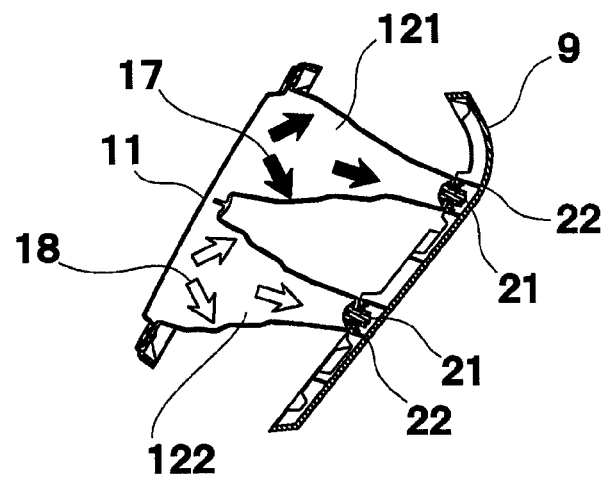
FIG. 13(c) is a sectional view taken along line A-A in FIG. 8 and showing completion phase of the operation of the air-bag device according to the first embodiment of the invention.

FIG. 12 shows the results of a high speed tensile test carried out at −30° C., 23° C. and 85° C. on an impact absorbing plastic. As the nominal stress-nominal strain curve in FIG. 12 shows, it was confirmed that the impact absorbing plastic used in this embodiment showed an elongation of about 20% to about 50% even in an environment of −30° C. and thus it exhibits excellent elongation characteristics even in a low temperature environment.

By virtue of use of the impact absorbing plastic which shows an elongation of about 20% to about 50% even in an environment of −30° C., such an air-bag device can be constructed as is capable of stable operation irrespective of the changing in climate and place.

On the other hand, the outer cover 9 is integrally formed with four connections 22, 22 protruding in the direction opposite to the driver's seat 2. The four connections 22, 22 have their tips formed with bolt holes 23, 23, respectively. The four connections 22, 22 are located at positions one-to-one corresponding to those of the upper cylinders 121, 121 and lower cylinders 122, 122 of the air-bag inner 10, respectively.

Accordingly, when the outer cover 9 is combined with the air-bag inner 10, the insertion holes 21 formed at the leading ends of the upper cylinders 121, 121 and lower cylinders 122, 122 of the air-bag inner 10 and the bolt holes 23 formed in the connections 22, 22 of the outer cover 9 are so aligned respectively as to one-to-one correspond to each other, and continuous screw holes are thereby formed by the insertion holes 21 and the bolt holes 23 respectively contiguous with each other. In each of the screw holes, a bolt 24 is screwed in such a manner that each pair of the leading end of the cylinder 12 and the connection 22 of the outer cover 9 are held between a nut (not shown) and a collar (not shown), and the outer cover 9 is thereby fixedly combined with the air-bag inner 10.

An inflator 15 is fixed at the inner side of the inflator mounting cavity 113 of the inflator case 11. When air-bag inner 10 is combined with the inflator case 11, the inflator 15 fixedly attached to the inflator mounting cavity 113 is located at a position facing the inflator accommodating cavity 16 of the air-bag inner 10 in the first gas flow path 17 extending along the gas flow regulating wall 19 on the side opposite to the second gas flow path 18 relative to the gas flow regulating wall 19.

Each of the air-bag device 7 and the vehicle occupant's lower limb protecting device of this embodiment comprises an acceleration sensor (not shown) for detecting deceleration of the vehicle body 1 to detect collision of the vehicle body 1, and the acceleration sensor is connected to a control circuit (not shown) equipped with a microcomputer.

In the next place, operation of the air-bag device 7 and the vehicle occupant's lower limb protecting device will be described in detail.

When the control circuit determines by a signal from the acceleration sensor that the vehicle body 1 has collided, the control circuit actuates the inflator 15. On actuation of the inflator 15, gas is jetted first into the first gas flow path 17. By the jetted gas, the upper cylinders 121, 121 are expanded.

At the moment, the outer surface of the rim 102 of the air-bag inner 10 and the inner surface of the rim 112 of the inflator case 11 are in air-tight contact with each other, and the air-bag inner surface 103 of the air-bag inner 10 and the step 114 of the inflator case 11 are in air-tight abutment on each other. Accordingly, the inner space between the air-bag inner 10 and inflator case 11 is kept hermetic. By virtue of this, the upper cylinders 121, 121 are being energy-absorbably expanded while keeping energy absorbing capacity for a certain level or higher in pressure.

When the upper cylinders 121, 121 are expanded, an upper portion of the outer cover 9 fixedly attached to the leading ends of the upper cylinders 121, 121 via the connections 22, 22 are energy-absorbably advanced toward the knees of the left and right legs 6A, 6B of the occupant 6.

Then, after a certain time lag, a gas flow proceeding to the second gas flow path 18 is generated. The gas flow proceeding to the second gas flow path 18 is generated in such a manner that inner pressure of the first gas flow path 17 is increased by the gas emitted from the inflator 15 to swell the inflator case 11 and a gap is consequently formed between the upper end of the gas flow regulating wall 19 and the bottom surface of the inflator mounting cavity 113 of the inflator case 11, as shown by the long dashed double-short dashed line in FIG. 9.

When the gas flow proceeding to the second gas flow path 18 is generated, the gas enters the lower cylinders 122, 122 disposed at both ends of the second gas flow path 18 to expand the lower cylinders 122, 122. Consequently, a lower portion of the outer cover 9 fixedly attached to the leading ends of the lower cylinders 122, 122 via the connections 22, 22 starts to energy-absorbably advance.

In the above process, each of the collision energy absorbing pleats 20, 20 of the upper cylinders 121, 121 and the lower cylinders 122, 122 energy absorbably develops from the folded state to expanded state having an external shape of a paraboloidal surface.

Each of the air-bag device 7 and the vehicle occupant's lower limb protecting device of this above-described embodiment comprises the independently operating groups of the cylinders 12, and a time lag by virtue of the structure thereof is provided between the behavior of the upper portion of the outer cover 9 to start energy-absorbably advancing by the expansion of the upper cylinders 121, 121 and the behavior of the lower portion of the outer cover 9 to start energy-abdorbably advancing by the expansion of the lower cylinders 122, 122. Accordingly, knees of an occupant of large build whose inertia load at the time of collision is great are surely protected by collective energy absorbing action of the upper cylinders 121, 121 and the lower cylinders 122, 122 at the time of collision.

On the other hand, in a case of an occupant of small build whose inertia load at the time of collision is small, positions of impact absorption for knees of the occupant of small build by the outer cover 9 are lower than those of an occupant of large build according to physical sizes. As a result, loads from the upper cylinders 121, 121 and the lower cylinders 122, 122 are exerted on the occupant in appropriate proportions according to physical size of the occupant to fulfill impact absorption at the time of collision.

By virtue of this, with respect to both of the occupant of large build for whom energy absorption amount is large and the occupant of small build for whom energy absorption amount is relatively small, appropriate energy absorption operations can be realized according to physical sizes.

It should be noted that for realizing this, it is not necessary to separately use a plurality of knee air-bag devices and it is only necessary to use only one air-bag device 7 of the present invention. Accordingly, use of only one air-bag device of the present invention is simpler as compared with the case where a plurality of knee air-bags are separately used. Further, the provision of the time lag is not performed particularly by computerized control but performed based on the structure of the air-bag device. Accordingly, the provision of the time lag is surely and inexpensively realized.

Moreover, as opposed to a conventional air-bag device with a single air-bag having a large volume, since each of the plurality of cylinders 12 which cooperatively operate on the time lag has a small volume, the cylinder 12 is capable of immediate response and capable of surely holding and protecting lower limbs of an occupant.

In the case of a conventional air-bag device with a single air-bag having a large volume, supply of a large amount of gas to the single large air-bag is inevitably necessary in order to expand the air-bag device with a single large air-bag, resulting in low expansion speed. In contrast thereto, in each of the air-bag device 7 and the vehicle occupant's lower limb protecting device of this embodiment, since the plurality of cylinders 12 are cooperatively operated on the time lag by means of the inflator 15 as a single gas source, the volume of each of the cylinders 12 can be reduced and expansion speed of each cylinder 12 can be increased.

Furthermore, an extended length of every cylinder 12 in the expanded state can be adjusted on a cylinder-to-cylinder basis. Accordingly, preferable energy absorbing operation by the appropriate expansions according to conditions of the occupant at the time of vehicle collision can be realized.

Figure 14:
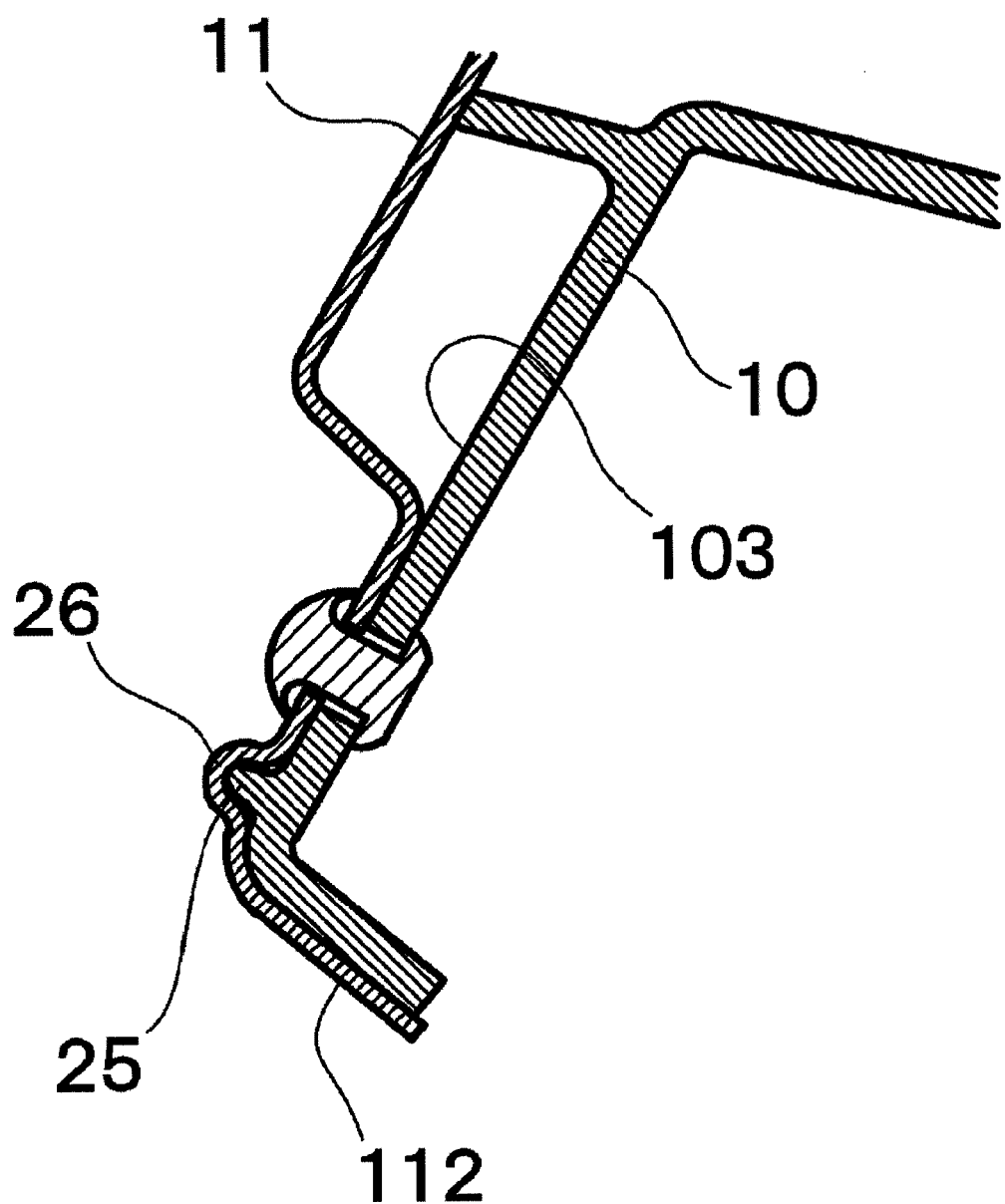
FIG. 14 is a partial sectional view of the air-bag device of the present invention according to a second embodiment.

Next, an air-bag device and the vehicle occupant's lower limb protecting device of the present invention according to a second embodiment will be described with reference to FIG. 14.

In the air-bag device of the second embodiment, a linear protrusion 25 is integrally formed on the air-bag inner surface 103 along the rim 102, and other structural features are the same as in the air-bag device of the first embodiment. On the other hand, on the side of the inflator case 11 which faces the air-bag inner 10 when inflator case 11 and the air-bag inner 10 are combined together, a groove 26 as a cavity in which the linear protrusion 25 is fitted is integrally formed corresponding to the linear protrusion 25 along the rim 112 of the inflator case 11.

In the air-bag device of the second embodiment, a seal structure is formed by the linear protrusion 25 and the groove 26 along the rim 102 of the air-bag inner 10 and the rim 112 of the inflator case 11.

Accordingly, when the air-bag inner 10 and the inflator case 11 are riveted to combine the air-bag inner 10 with the inflator case 11, air-tightness is enhanced by providing the seal structure composed of the linear protrusion 25 and the groove 26 which are fitted to each other, in addition to such a seal structure that the outer surface of the rim 102 of the air-bag inner 10 and the inner surface of the rim 112 of the inflator case 11 are in air-tight contact with each other, and the air-bag inner surface 103 and the step 114 are in air-tight abutment on each other, and the inner space between the air-bag inner 10 and the inflator case 11 is kept hermetic.

Then, an air-bag device and an vehicle occupant's lower limb protecting device of a third embodiment of the present invention will be described with reference to FIGS. 15 to 19.

The air-bag device 7 of the third embodiment has a pair of air-bag inners (10a, 10b) which are separate pieces. Correspondingly to this, an inflator case 11 is integrally formed in such a configuration that it has an inflator case side section 11a and an inflator case side section 11b at both wings of the inflator case 11 and an inflator case center section 11c connecting the inflator case side section 11a and inflator case side section 11b. The inflator case side section 11a and the inflator case side section 11b are formed into a shape or shapes corresponding to that or those of the air-bag inner 10a and the air-bag inner 10b, respectively. Accordingly, in the air-bag device 7 of the third embodiment, gas is supplied from an inflator 15 to a hermetically sealed space formed when the air-bag inner 10a and the air-bag inner 10b are respectively combined with the inflator case side section 11a and the inflator case side section 11b at positions corresponding to those of lenses of the inflator case 11 having a spectacles-like shape.

The inflator case center section 11c is provided with an outward (downward) extended portion at the center between the inflator case side section 11a and inflator case side section 11b. In the outward (downward) extended portion, an inflator mounting cavity 113 is formed. The inflator mounting cavity 113 is so formed that the direction perpendicular to the left-right direction of the inflator case 11 is a longitudinal direction of the inflator 15, and when the inflator 15 is mounted in the inflator mounting cavity 113, one end portion of the inflator 15 outward (downward) protrudes from the edge of the extended portion of the inflator case 11.

On the inflator case center section 11c, an inflator plate 27 made of a metal is mounted. The inflator plate 27 is provided with an inflator mounting cavity 271 at a position facing the inflator mounting cavity 113 of the inflator case center section 11c.

Accordingly, the inflator plate 27 is mounted on the inflator case center section 11c to thereby form a cylindrical inflator mounting section defined by the inflator mounting cavity 113 and the inflator mounting cavity 271, and the inflator 15 is mounted in the cylindrical inflator mounting section with an O-ring mounted on its middle and its one end portion protruding outward.

On the air-bag inner 10a and the air-bag inner 10b, rings 29a, 29b made of a metal which have substantially the same shape as contours of the air-bag inners 10a, 10b are mounted, respectively.

Each of the ring 29a and the ring 29b has insertion holes 291, 292 for respectively inserting therethrough an upper cylinder 121 and a lower cylinder 122 held by each of the air-bag inner 10a and the air-bag inner 10b.

Figure 15:
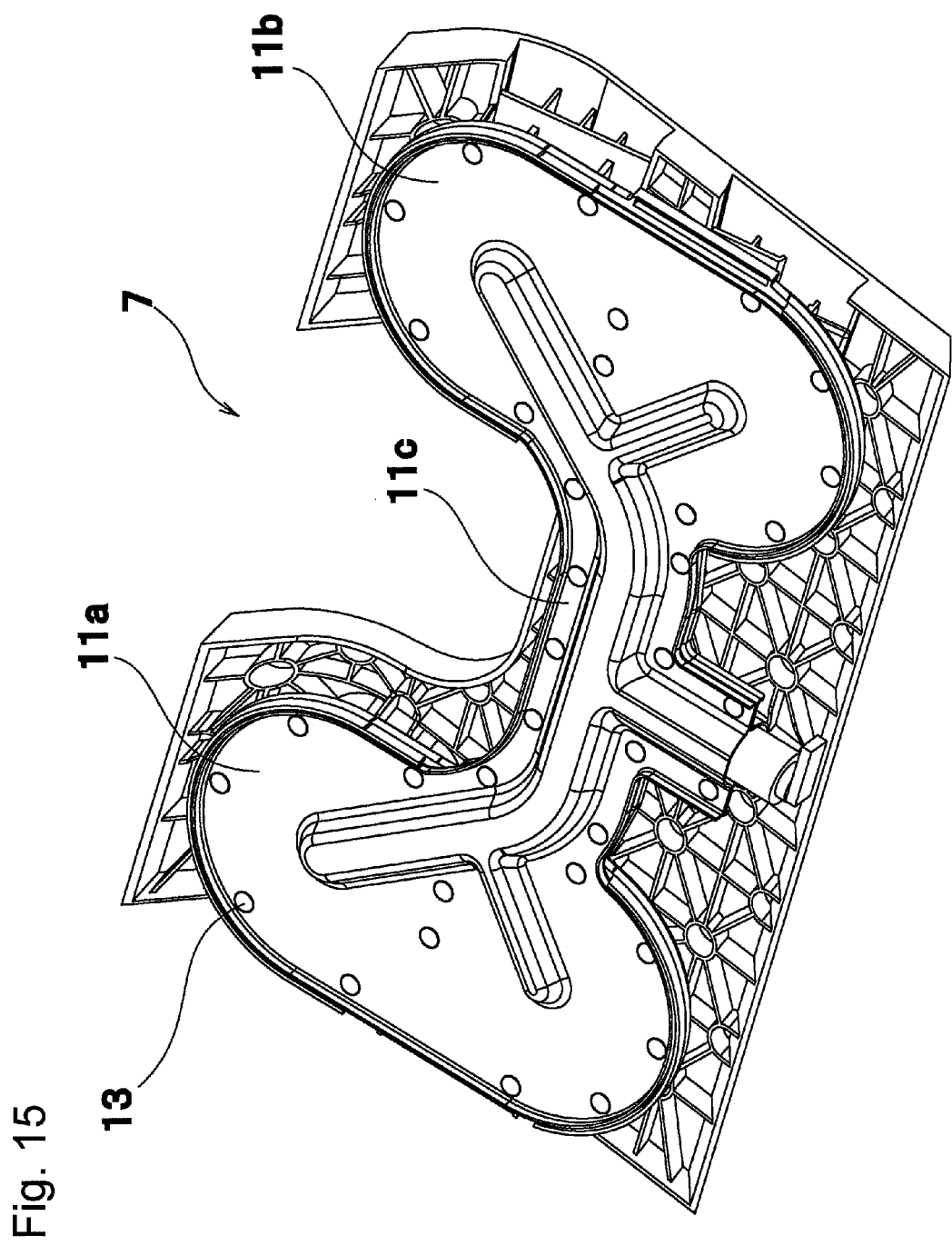
FIG. 15 is a perspective view of the air-bag device of the present invention according to a third embodiment.
Figure 16:
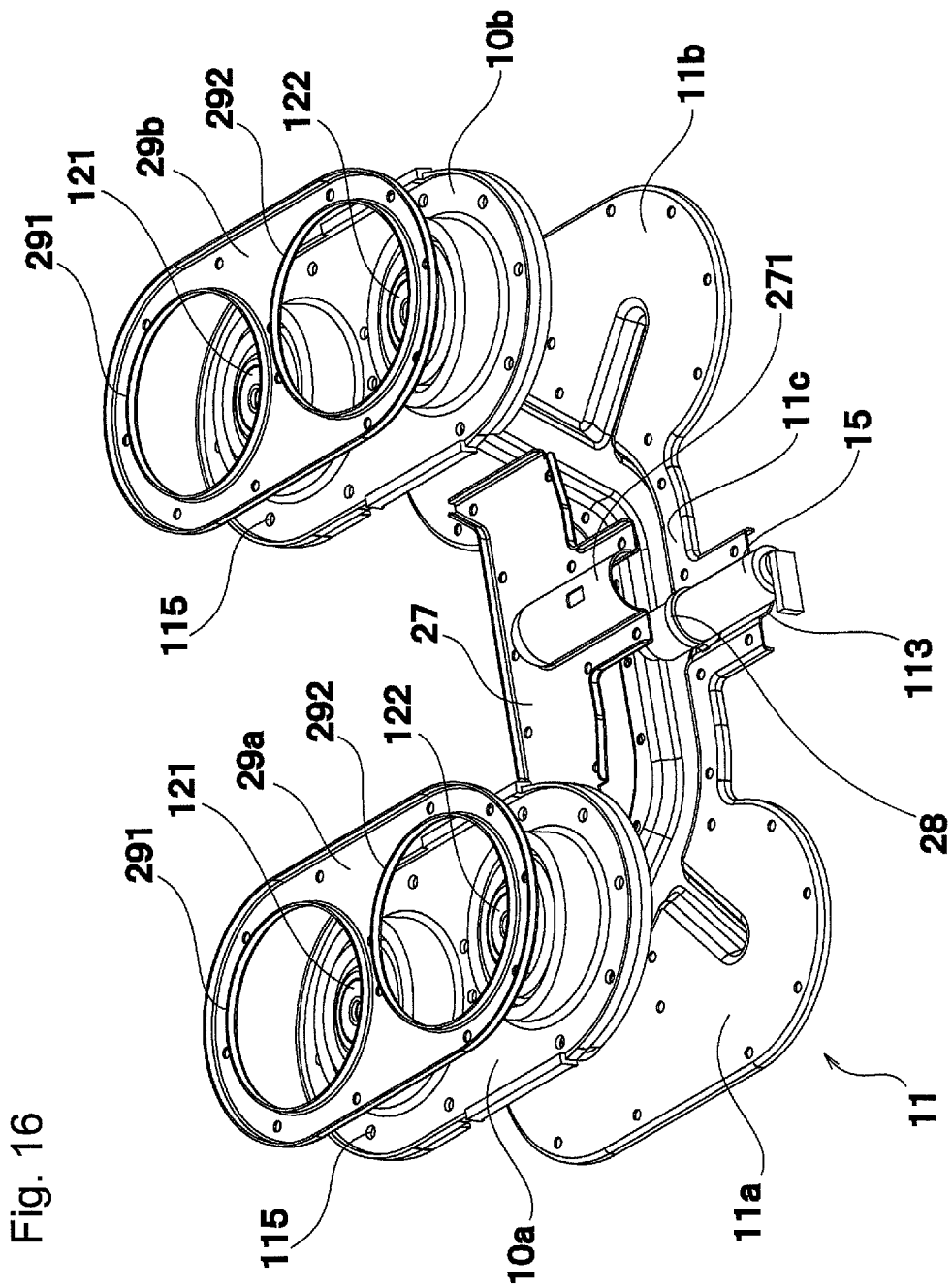
FIG. 16 is an exploded perspective view of the air-bag device of the present invention according to the third embodiment.
Figure 17:
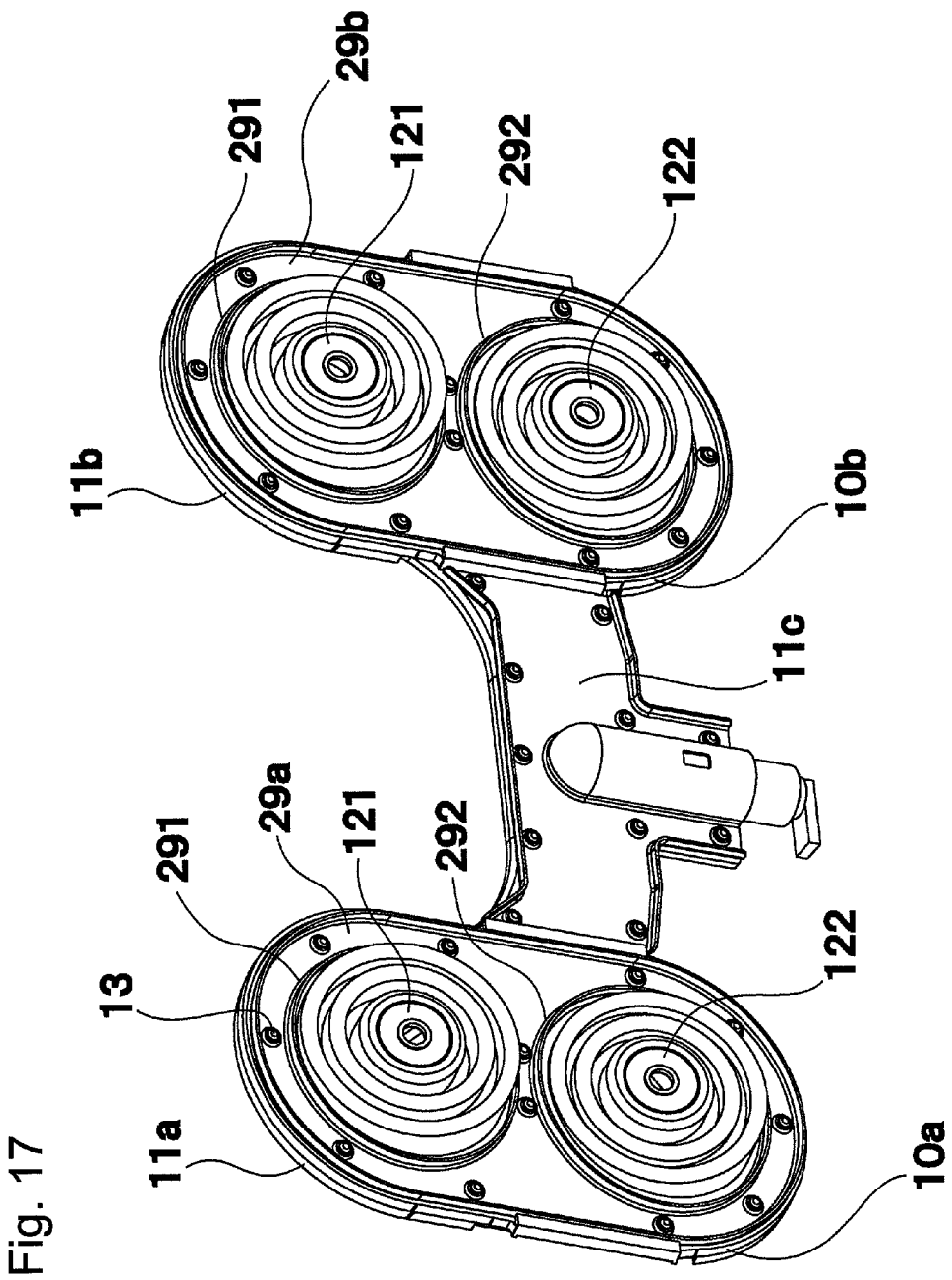
FIG. 17 is another perspective view of the air-bag device of the present invention according to the third embodiment.

As shown in FIGS. 15 to 17, the ring 29a and the ring 29b are respectively abutted on the planer body portions of the air-bag inner 10a and the air-bag inner 10b with the upper cylinders 121 and the lower cylinders 122 inserted through the insertion holes 291, 292, respectively, in such a manner that the air-bag inner 10a and the air-bag inner 10b are held between the ring 29a, 29b and the inflator case side sections 11a, 11b, respectively.

In such arrangements, the inflator case side section 11a, the air-bag inner 10a and the ring 29a, and the inflator case side section 11b, air-bag inner 10b and the ring 29b are combined together, respectively, by inserting rivets 13, 13 in rivet holes 115, 115.

Figure 18:
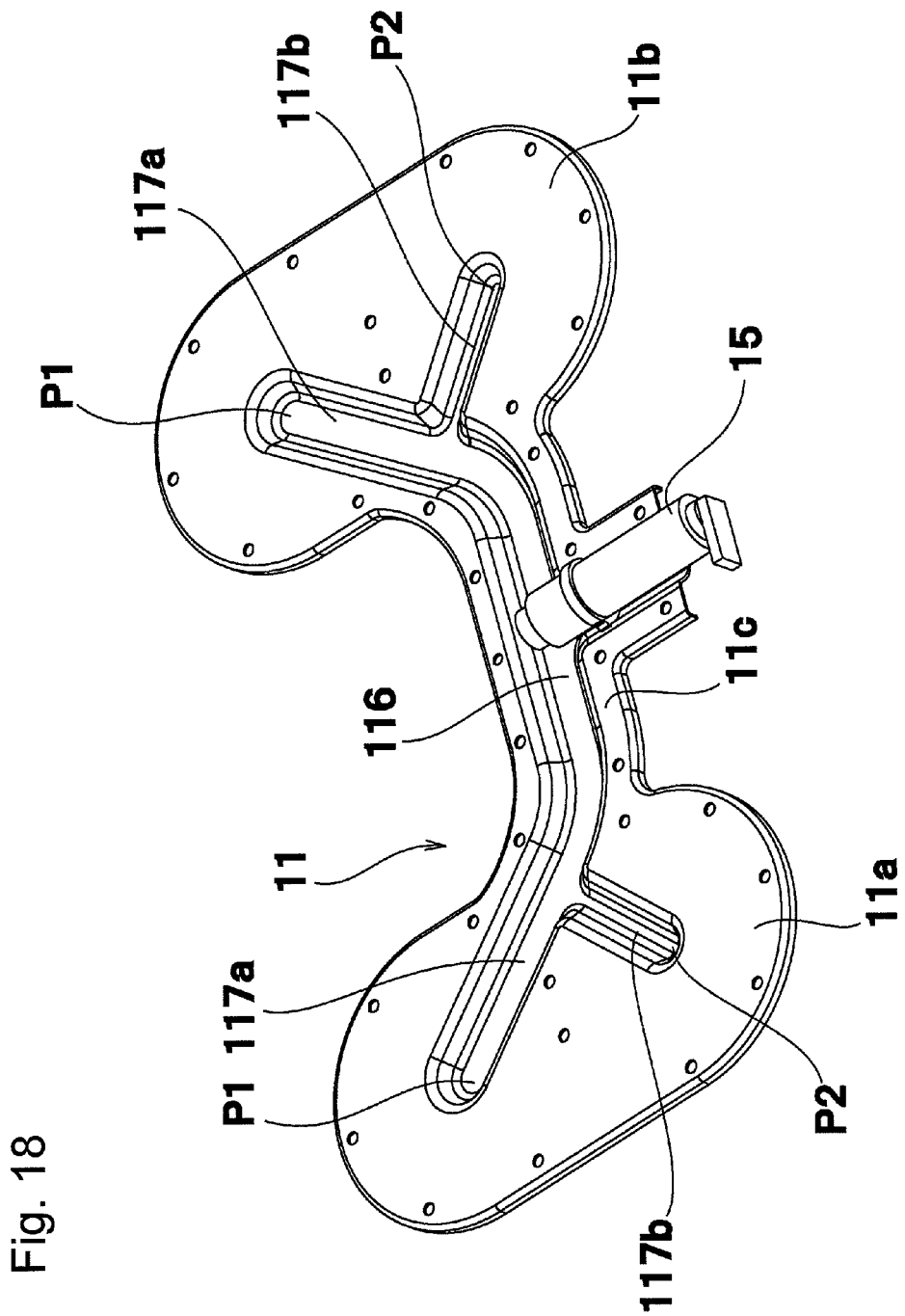
FIG. 18 is an exploded perspective view of the air-bag device of the present invention according to the third embodiment.

As shown in FIG. 18, in the inflator case center section 11c, there is formed a gas flow path 116 in the form of a cavity extending between the inflator case side section 11a and inflator case side section 11b.

The gas flow path 116 provides a path in which gas supplied from the inflator 15 mounted on the inflator case center section 11c flows.

On the other hand, in each of the inflator case side section 11a and the inflator case side section 11b, there are formed a first gas flow path 117a continuously extending to a position P1 corresponding to that of the upper cylinder 121 formed in the corresponding air-bag inner 10a or 10b and a second gas flow path 117b diverging from the first gas flow path 117a and extending to a position P2 corresponding to that of the lower cylinder 122.

The gas flow path 116 of the inflator case 11 is in communication with the first gas flow path 117a and the second gas flow path 117b.

Cross-sectional areas of the first gas flow path 117a and the second gas flow path 117b are set in such relationship that first gas flow path 117a which is a gas passageway to the upper cylinder 121 has a cross-sectional area greater than that of the second gas flow path 117b which is a gas passageway to the lower cylinder 122.

This enables the upper cylinder 121 to expand in advance of the lower cylinder 122.

Figure 19:
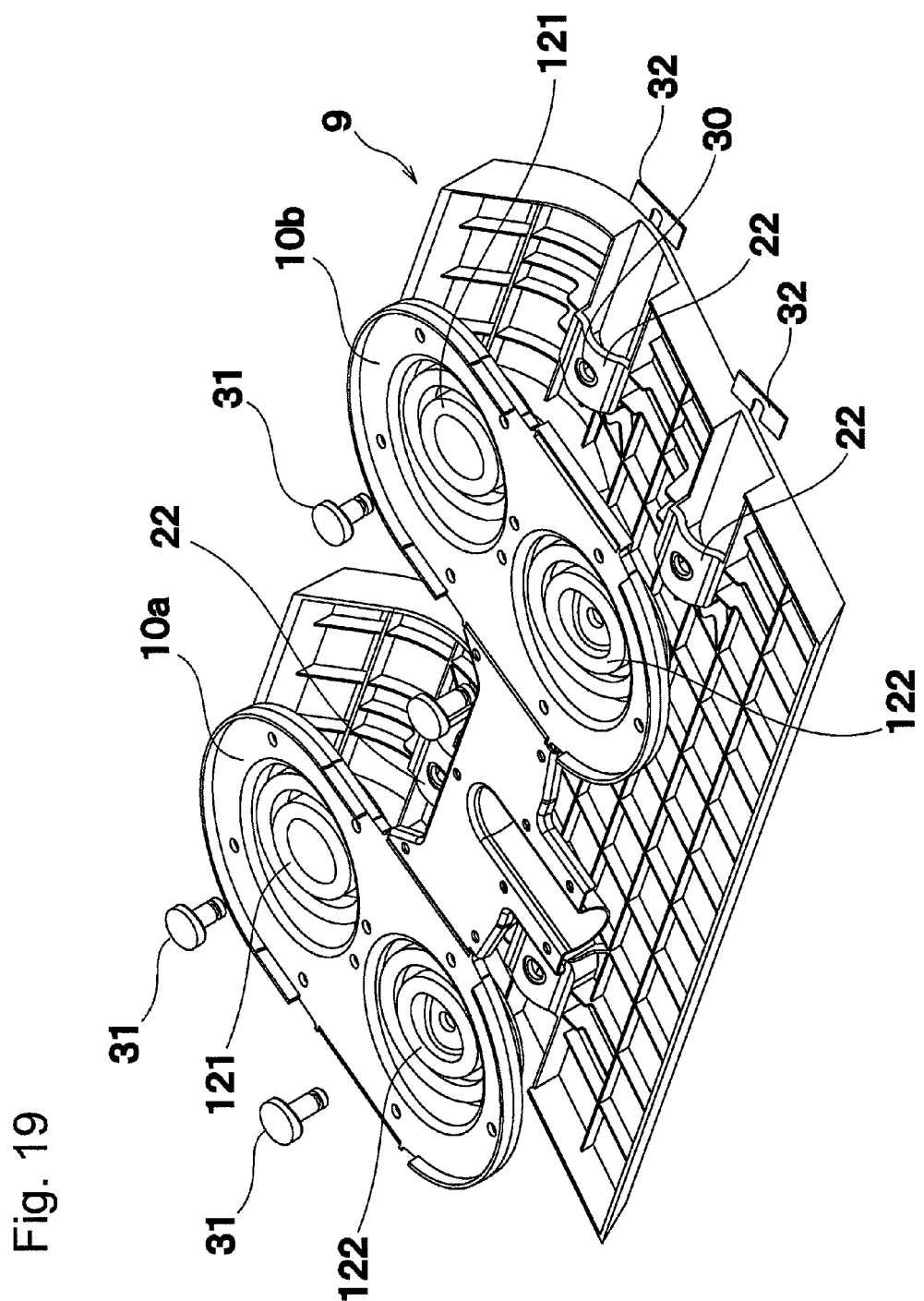
FIG. 19 is another exploded perspective view of the air-bag device of the present invention according to the third embodiment.

As shown in FIG. 19, the air-bag inner 10a and the air-bag inner 10b are combined with the outer cover 9 in such a manner that a plastic pin 31 is inserted through each continuous pinhole (,i.e., each suite of aligned insertion and pin holes 21, 30) composed of an insertion hole 21 formed in a leading end of each of the upper cylinders 121, 121 and the lower cylinders 122, 122 and a pin hole 30 formed in each of connections 22, 22 of the outer cover 9, and the plastic pin 31 is locked with a stopper 32 made of a metal to fixedly combine the outer cover 9 with the air-bag inner 10. As described above, the leading end of each of the upper cylinders 121, 121 and the lower cylinders 122, 122 is fixed to the outer cover 9 with the plastic pin 31. Accordingly, as compared with using the metallic bolts 24, not only a reduction in the total weight but also a reduction in the weight of the leading end of each of the cylinders 12 are realized, thereby improving the expanding and responding performances of each cylinder 12.

The air-bag inner 10a and the air-bag inner 10b are prepared by molding a plastic or an elastomer (for example, TPO). When a plastic or an elastomer is used, the cylinders integrally 12 formed with the bodies of the air-bag inners are expanded at a lower inner pressure as compared with the case where an impact absorbing plastic is used. This enables improvement of expanding performance and responding performance of each of the cylinders 12. If desired, the air-bag inner 10a and the air-bag inner 10b may be made of an elastomeric material such as a rubber.

By virtue of use of the parts as described above, the air-bag inner 10a or 10b can be prevented from swelling during expansion of the upper cylinders 121 and the lower cylinders 122. This enables improvement of expanding performance and responding performance of each of the upper and lower cylinders 121, 122.

Further, since the press-molded inflator plate 27 made of a metal is mounted on the inflator case center section 11c to thereby form the first gas flow path 116 into which gas supplied from the inflator 15 flows, swelling of vicinities of the inflator 15 is extremely prevented and pressure loss is diminished. This enables rapid gas supply to each of the cylinders 12.

In the air-bag device of the third embodiment, amount of the gas supplied from the inflator 15 to cylinders 12 can be adjusted by the cross-sectional area of the first gas flow path 117a and/or the cross-sectional area of the second gas flow path 117b. This enables timing control of expansion of each of the cylinders 12 to be effected simply with excellent accuracy.

Figure 20:
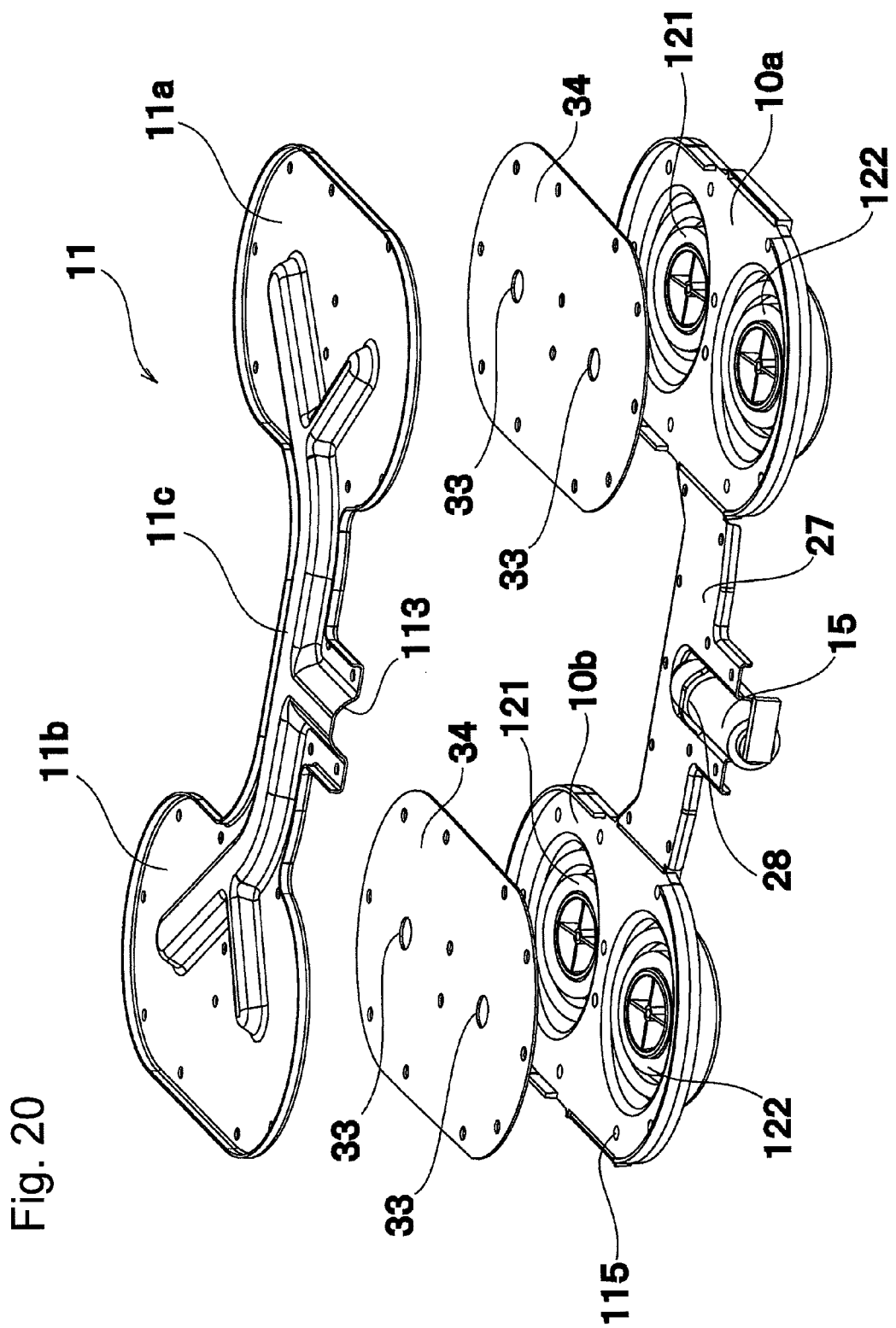
FIG. 20 is an exploded perspective view of the air-bag device of the present invention according to a fourth embodiment.
Figure 21:
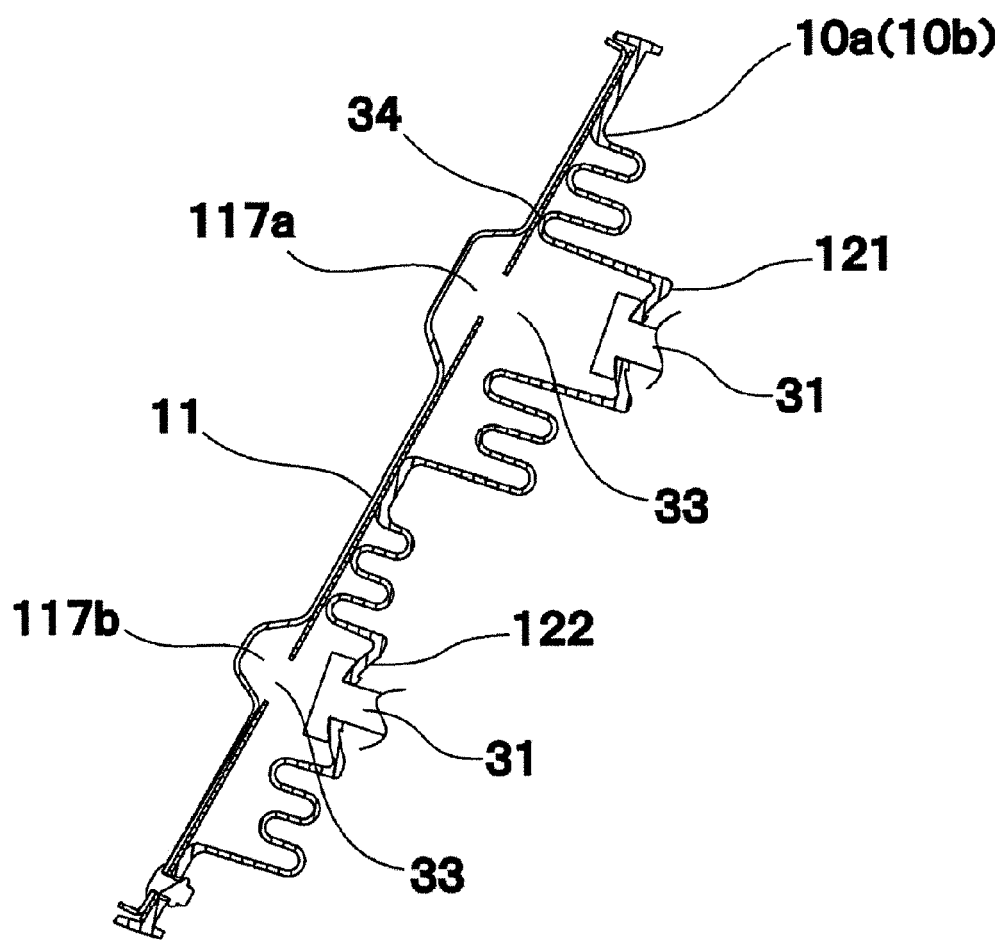
FIG. 21 is a partial sectional view of the air-bag device of the present invention according to the fourth embodiment.

Then, an air-bag device and an vehicle occupant's lower limb protecting device of a fourth embodiment of the present invention will be described with reference to FIGS. 20 and 21.

In the air-bag device of the fourth embodiment, an orifice plate 34 formed with orifices 33 is interposed between an inflator case side section 11a and an air-bag inner 10a, and an orifice plate 34 formed with orifices 33 is interposed between an inflator case side section 11b and an air-bag inner 10b, and other structural features are the same as in the air-bag device of the third embodiment. Accordingly, in the air-bag device of the fourth embodiment, gas can be injected concentratively into a central portion of each of the cylinders 12 through the orifice 33, and gas supply amount can be adjusted by changing a diameter of the orifice 33.

As described above, the orifice plates 34 are interposed to adjust the gas supply amount by setting the diameter of the orifices 33, and gas is injected concentratively into a central portion of each of the cylinders 12 through the orifice to facilitate expansion of each of the cylinders 12 even in a case where the air-bag inner 10 is made of a relatively rigid material. Accordingly, expanding performance and responding performance are improved.

Then, an air-bag device of a fifth embodiment of the present invention will be described with reference to FIGS. 22 and 23.

In the air-bag device of the fifth embodiment, an outer cover 9 has a double structure or a laminated structure so as to have improved mechanical strength, and other structural features than this point are the same as in the air-bag device of the third embodiment.

To obtain the double or laminated structure, a method may be employed which comprises fixedly attaching a plastic panel 35 onto the front surface of the outer cover 9 by vibration welding or the like. Alternatively, a metal plate 36 having a shape conforming to that of the back surface of the outer cover 9 may be attached to the back surface of the outer cover 9.

Figure 24:
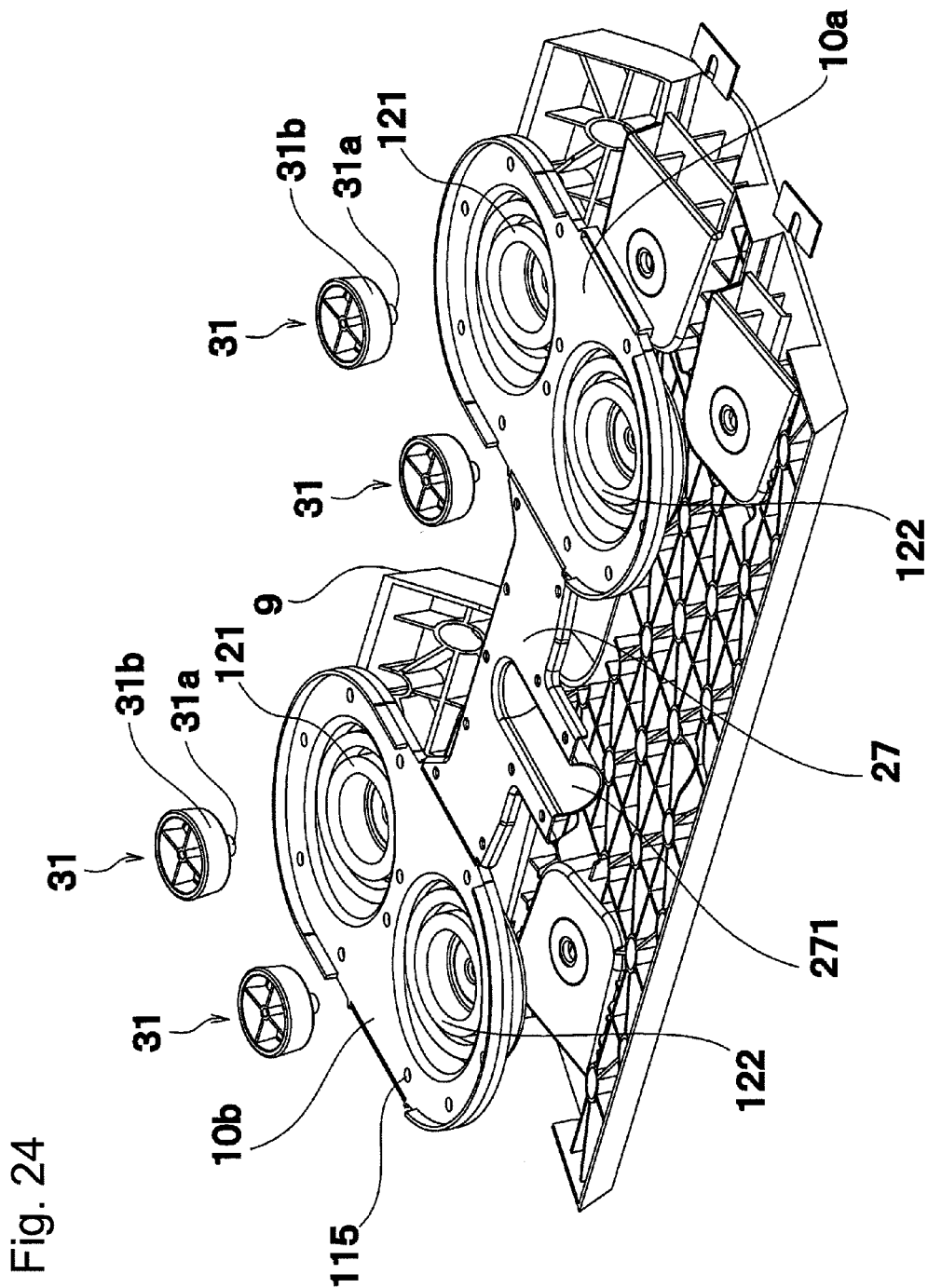
FIG. 24 is an exploded perspective view of the air-bag device of the present invention according to a sixth embodiment.

Then, an air-bag device of a sixth embodiment of the present invention will be described with reference to FIGS. 24 and 25.

In the air-bag device of the sixth embodiment, a plastic pin 31 which connects an outer cover 9 and a cylinder 12 has such a structure that it has a tip 31a protruding from the cylinder 12 and a collapse preventing wall 31b integrally formed with the tip 31a and expanded from the base end of the tip 31a, as shown in FIG. 25(a), and other structural features are the same as in the air-bag device of the third embodiment. As shown in FIG. 25(b), the plastic pin 31 is attached to the leading end of the cylinder 12 with the tip 31a protruding from the leading end of the cylinder 12 and the collapse preventing wall 31b located inside the leading end of the cylinder 12.

As shown in FIG. 26(b), in a process where the outer cover 9 is brought into contact with knees and the knees push the leading end of each of the cylinders 12 toward the inside of the cylinder 12, local distortion is likely to occur in the vicinity of the leading end of the cylinder 12 to thereby cause collapse at the leading end of the cylinder 12. In the air-bag device according to this embodiment, however, since the plastic pin 31 is attached to the leading end of the cylinder 12 with the collapse preventing wall 31b located inside the leading end of the cylinder 12, occurrence of such local distortion is prevented to thereby prevent collapse of the leading end of the cylinder 12, as shown in FIG. 26(a).

As a result, a stress is distributed among all the cylinders 12 to smoothly compress the cylinders 12. This enables the cylinders 12 to smoothly absorb energy.

Figure 27:
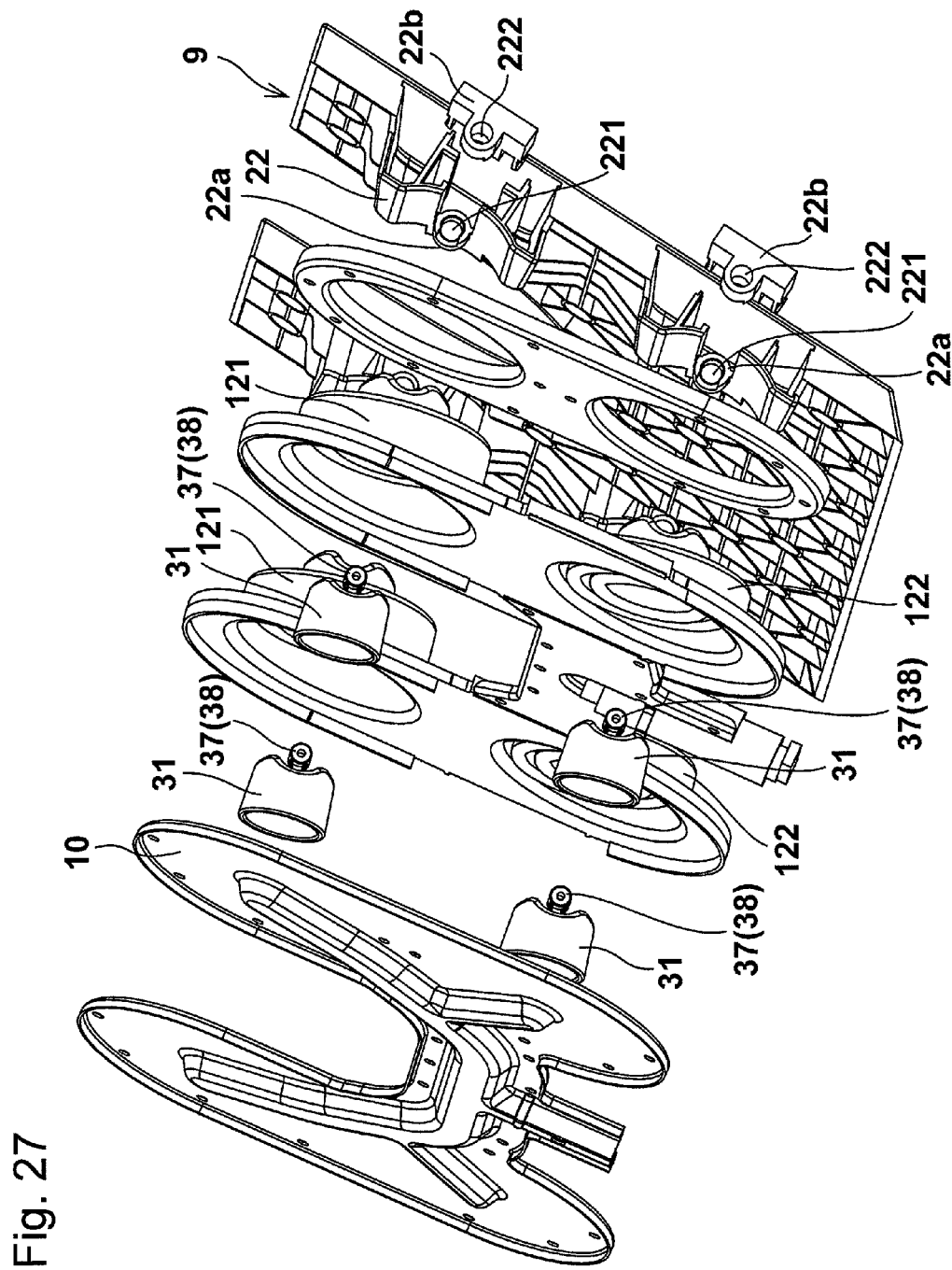
FIG. 27 is an exploded perspective view of an air-bag device of the present invention according to a seventh embodiment.
Figure 28:
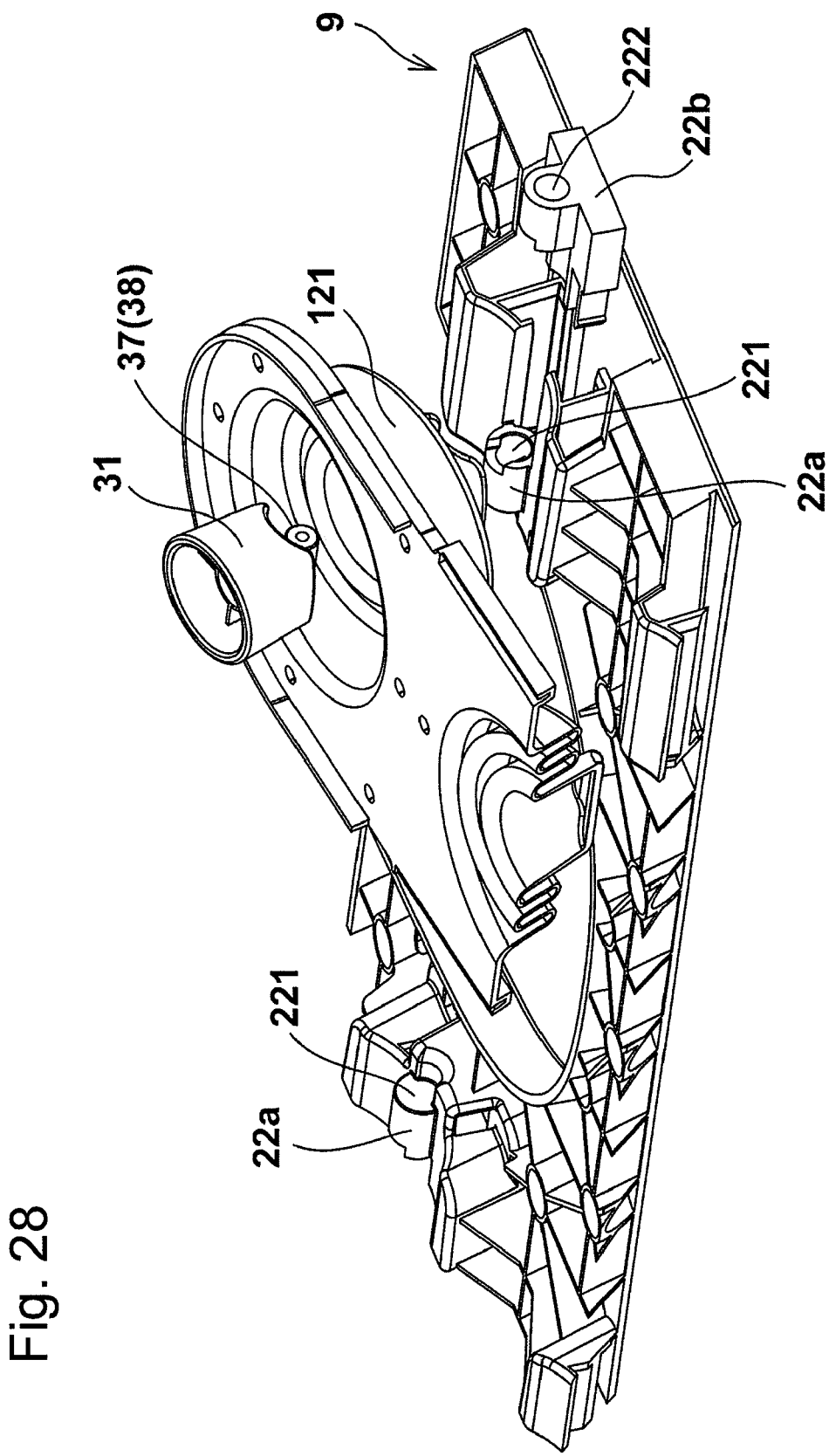
FIG. 28 is a partial cutaway exploded perspective view of the air-bag device of the present invention according to the seventh embodiment.
Figure 29:
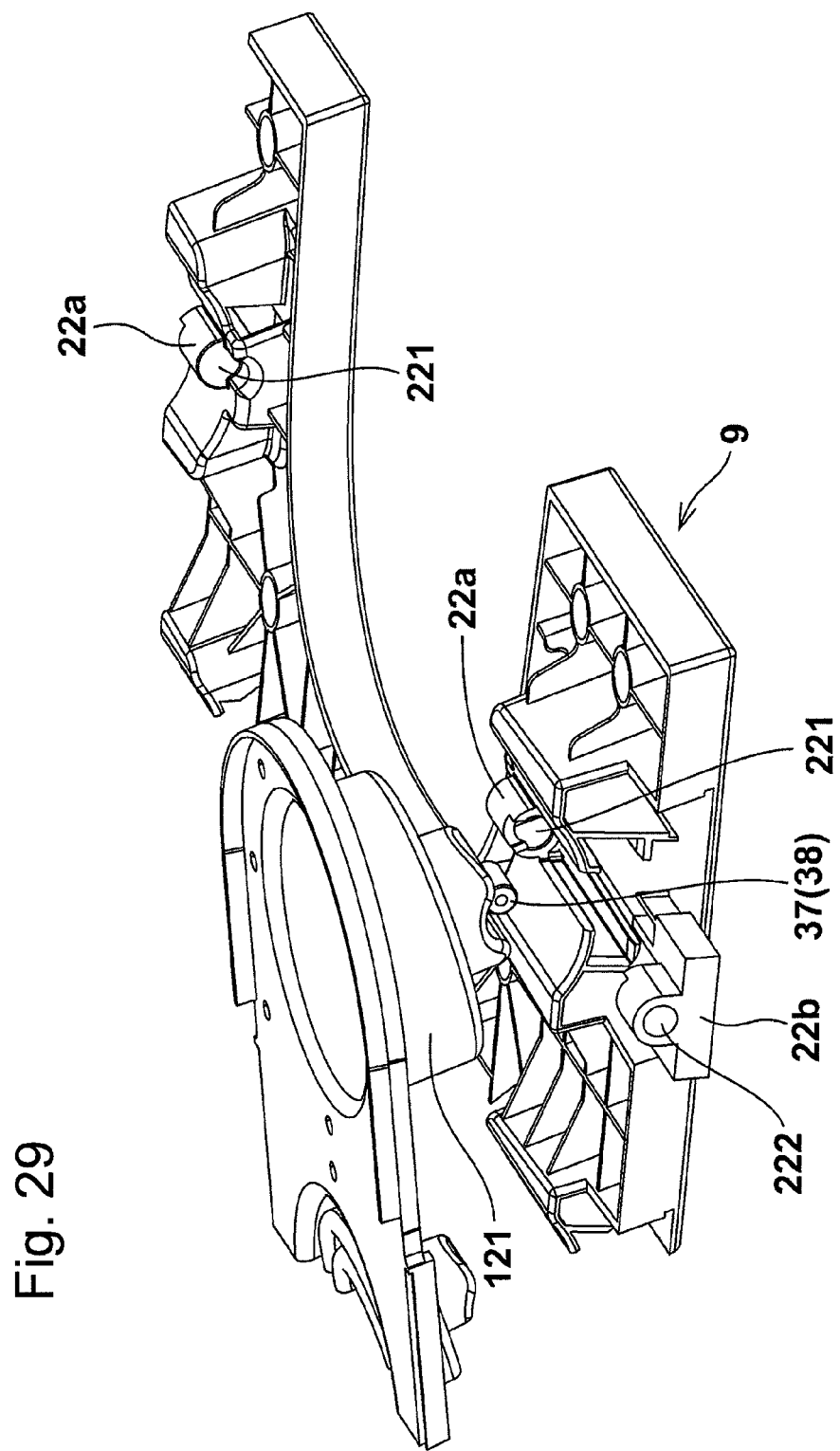
FIG. 29 is another partial exploded perspective view of the air-bag device of the present invention according to the seventh embodiment.
Figure 30:
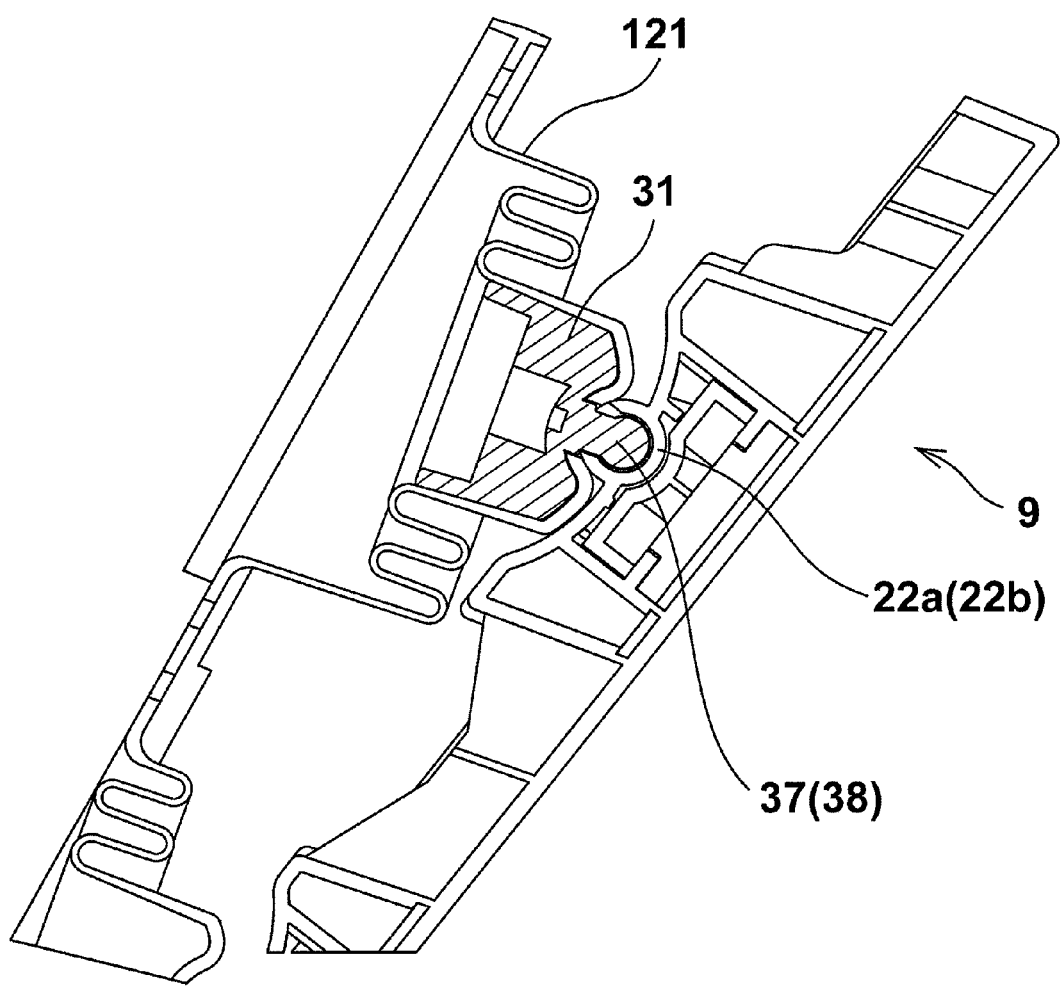
FIG. 30 is a partial sectional view of the air-bag device of the present invention according to the seventh embodiment.

Next, an air-bag device of a seventh embodiment of the present invention will be described with reference to FIGS. 27, 28 and 29.

The air-bag device of the seventh embodiment applies joints 38 having rotational axes 37 to the tips 31a of the plastic pins 31 coupling the outer cover 9 with the cylinder 12.

The rotational axis 37 of the joint 38 is disposed such that Z direction, i.e., the axial direction thereof, is perpendicular to X and Y directions, respectively. Herein, X direction represents a traveling direction of a vehicle body 1 and Y direction represents the vertical direction of the vehicle body 1 perpendicular to X direction.

On the other hand, bearing portions 22a are formed integral with the outer cover 9 in the connections 22 of the outer cover 9. In the bearing portions 22*a*, bearing holes 221 are formed. Further, stoppers 22*b* are provided as different components wherein bearing holes 222 are formed. By applying the stoppers 22*b* to the connections 22 of the outer cover 9, a series of bearings are formed by the bearing holes 221 of the bearing portions 22*a* and the bearing holes 222 of the stoppers 22*b*.

According to the air-bag device of the seventh embodiment, with one end of the rotational axis 37 of the joint 38 on the tip 31*a*, being inserted through the bearing hole 221 of the bearing portion 22*a*, the other end is inserted through the bearing hole 222 and the stopper 22*b* is applied to the connection 22. Further, the tips 31*a* of the plastic pins 31 fixed on the leading ends of the upper cylinders 121 and lower cylinders 122, are fitted to the outer cover 9.

Figure 31:
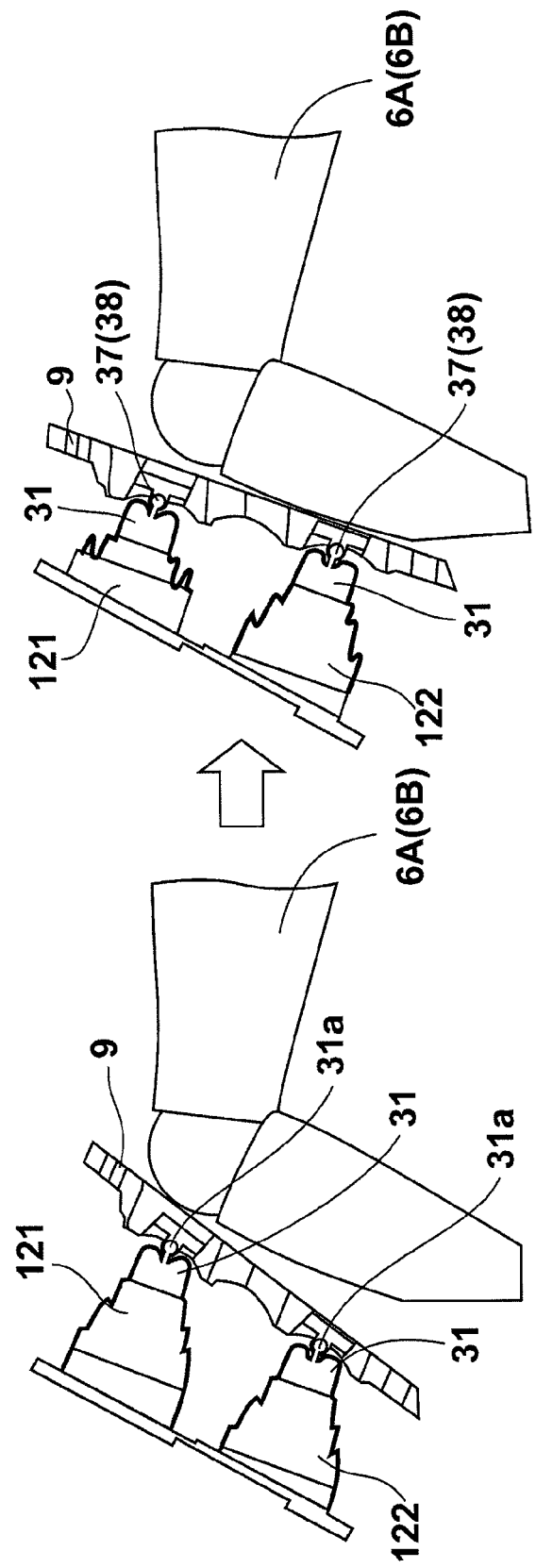
FIG. 31 is an illustrative view of operation of the air-bag device of the present invention according to the seventh embodiment.

According to the air-bag device of such a configuration as applied in the seventh embodiment shown in FIG. 31, the upper cylinders 121 and lower cylinders 122 are expanded such that the outer cover 9 pushes on to the occupant's left and right legs 6A and 6B by virtue of the tips 31*a*. Thereby, even if the outer cover 9 touches the knees of occupant's left and right legs 6A and 6B and inclines, the rotational axes 37 of the joints 38 will rotate on the inner sides of the bearing holes 221 of the bearing portions 22*a* and the bearing holes 222 of the stoppers 22*b* and thereby be unaffected by the inclination of the outer cover 9. Hence, the leading ends of the upper cylinders 121 and lower cylinders 122 can maintain the posture of each of the cylinders 121 and 122 in the expanding axial direction, thereby being able to further push the upper cylinders 121 and lower cylinders 122 in the expanding direction. Hence, the upper cylinders 121 and lower cylinders 122 will not buckle and be able to exert the preset reaction force, thereby efficiently absorbing the energy.

Figure 32:
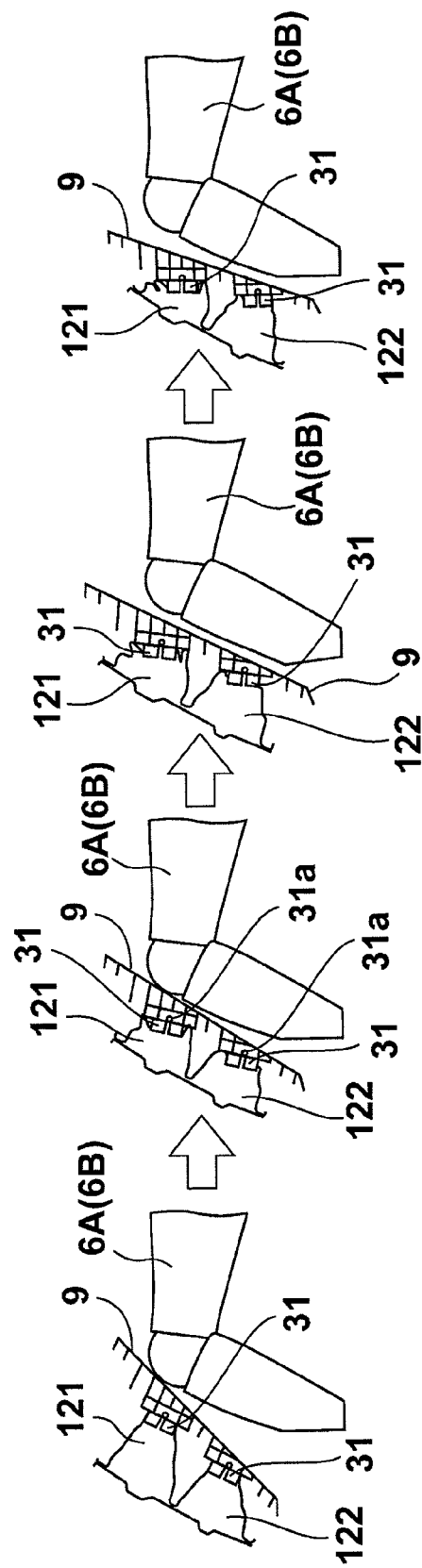
FIG. 32 is an illustrative view of operation in the case of not exerting the air-bag device of the present invention according to the seventh embodiment.

On the contrary, if the joints 38 having the rotational axes 37 are not provided in the tips 31*a*, as shown in FIG. 32, the tip 31*a* of each of the cylinders 121 and 122 will follow in the inclination of the outer cover 9. As a result, after the upper cylinders 121 and lower cylinders 122 are expanded, the outer cover 9 may greatly incline according to the position of the knees touching the outer cover 9. Thereby, the knees of the occupant's left and right legs 6A and 6B, touching the outer cover 9, will push back the thus inclined outer cover 9 in the vehicle's traveling direction, thereby allowing the tip 31*a* of each of the cylinders 121 and 122, following in the inclination of the outer cover 9, to fall into a pushed-in state while inclined. As a result, any of the upper cylinders 121 and lower cylinders 122 may buckle and thereby bring on damage due to stress concentration or inability to exert the preset reaction force, giving possible adverse affect on the restraining performance.

In addition, the joint 38, and the bearing portion 22*a* and the stopper 22*b* for supporting the joint 38 on the side of the outer cover 9, may be made of resin or resin in partial combination with metal component(s).

Figure 33:
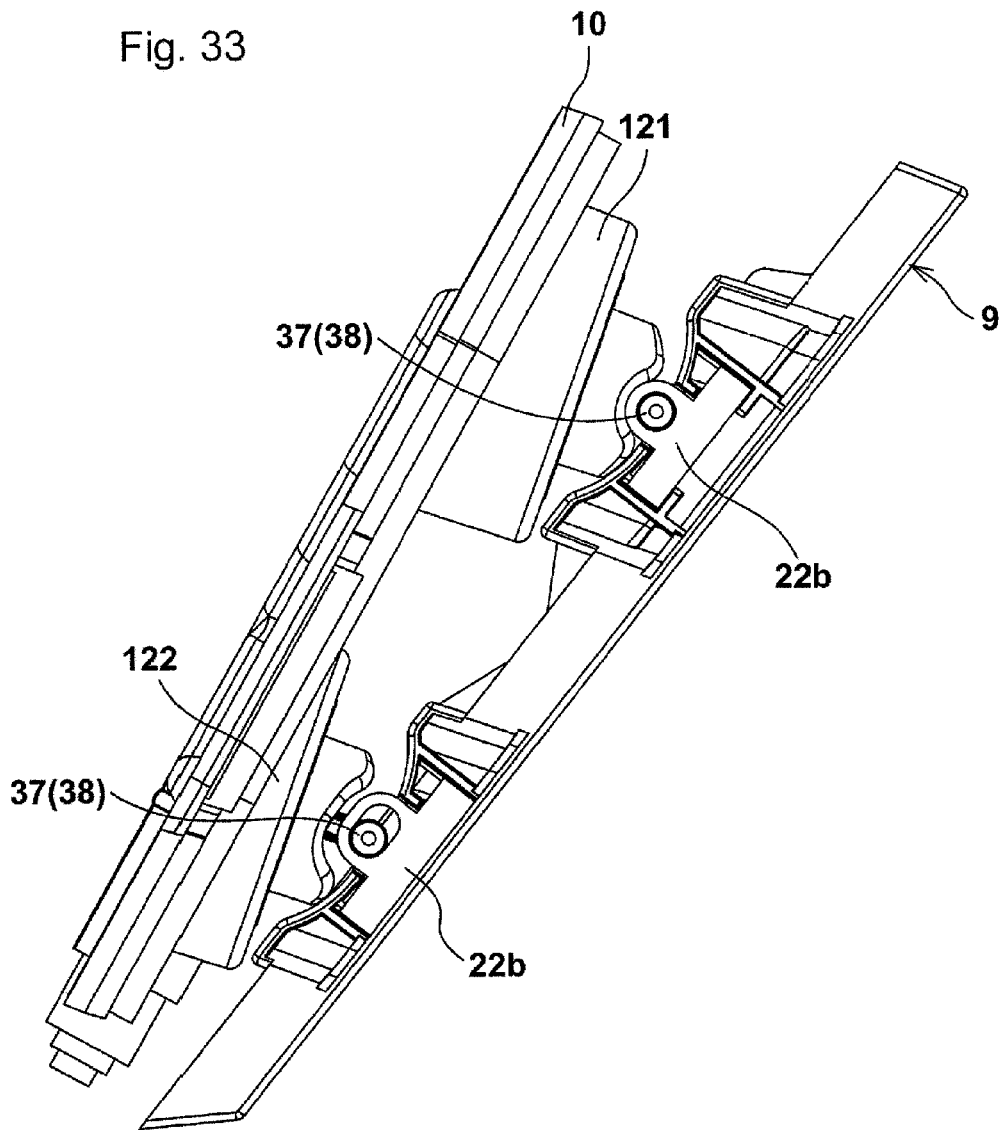
FIG. 33 is a side view of another aspect of the air-bag device of the present invention according to the seventh embodiment.
Figure 34:
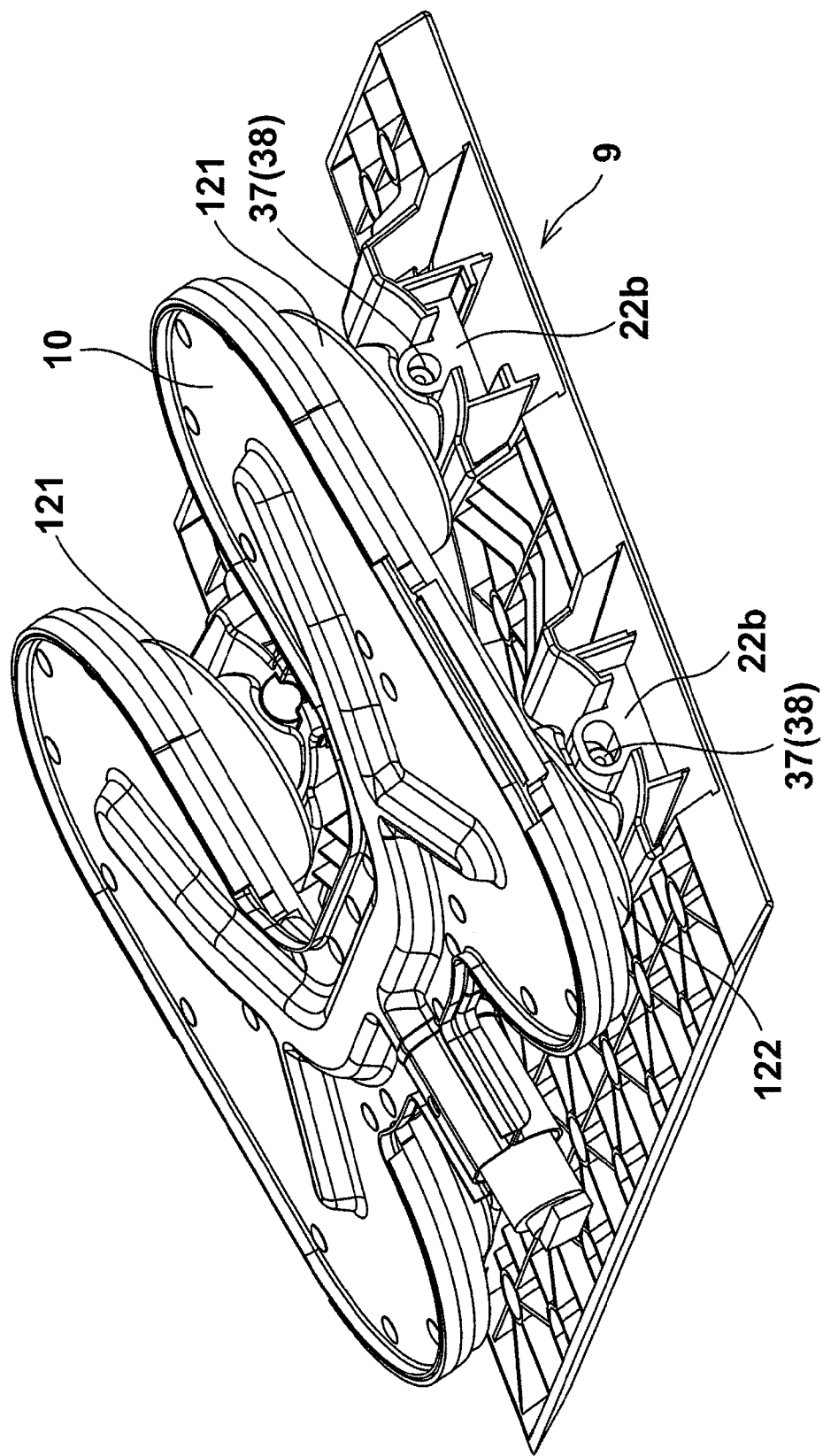
FIG. 34 is a partial exploded perspective view of another aspect of the air-bag device of the present invention according to the seventh embodiment.

As shown in FIGS. 33 and 34, the rotational axes 37 are circular in cross section while the bearings formed by the bearing holes 221 of the bearing portions 22*a* and the bearing holes 222 of the stoppers 22*b*, may be elliptical in cross section. The ellipse is configured such that the long axis thereof is parallel to the inclination in the vertical direction of the air-bag inner 10.

In this manner, by virtue of the elliptical cross-section bearings for the rotational axes 37 corresponding to at least one of the upper cylinders 121 and lower cylinders 122, the tips 31*a* of the plastic pins 31 further increase in degree of freedom, thereby more reliably preventing the tip 31*a* of each of the corresponding cylinders 121 and 122 from following in the inclination of the outer cover 9. Hence, the posture of each of the cylinders 121 and 122 expanded along the expanding axes can be more reliably maintained.

In addition, the posture of each of the expanded cylinders 121 and 122 can also be maintained by forming the plastic pin 31 and the connection with the outer cover 9 into a universal joint mechanism (not shown).

Figure 35:
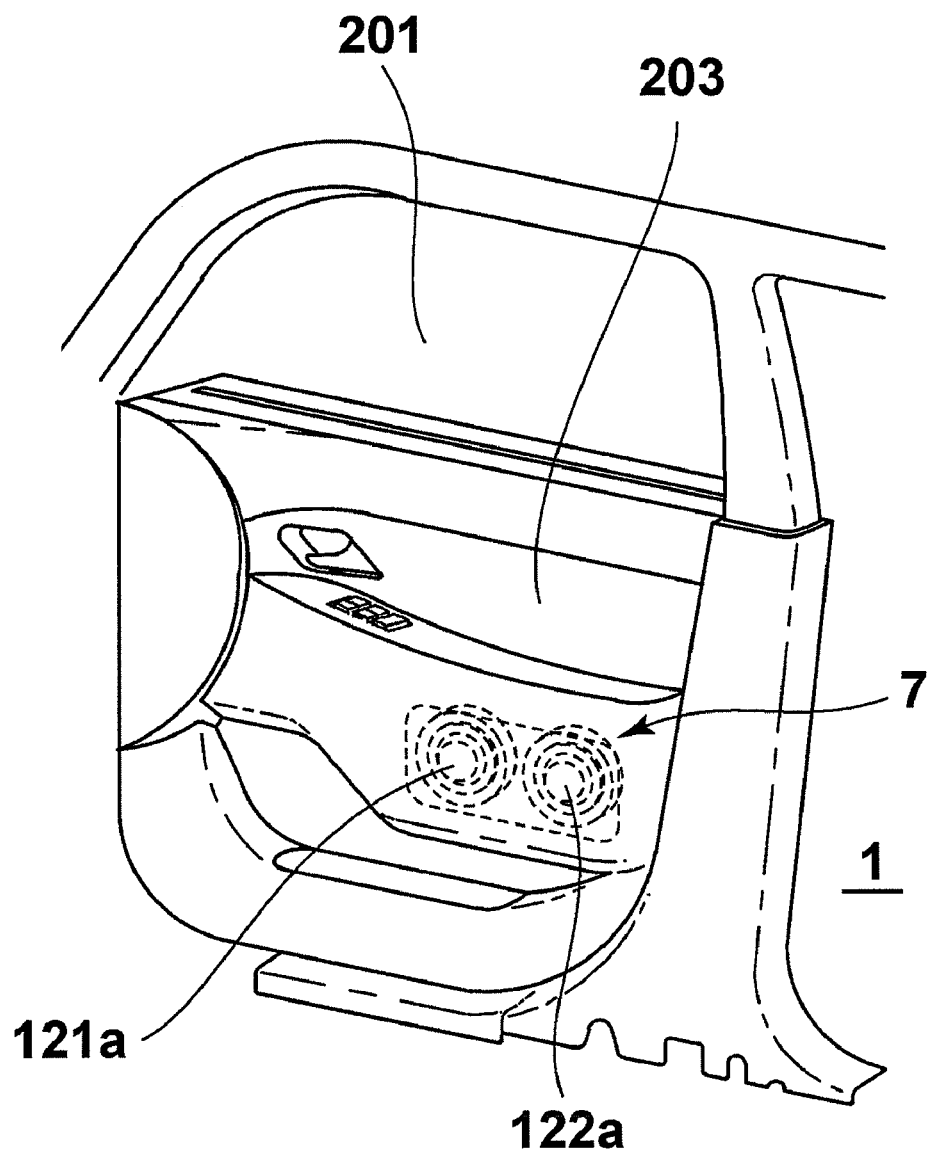
FIG. 35 is a partial sectional view of a vehicle door equipped with the device for protecting occupant at the time of vehicle side collision which uses the air-bag device of the present invention according to any of the first to seventh embodiments.
Figure 36:
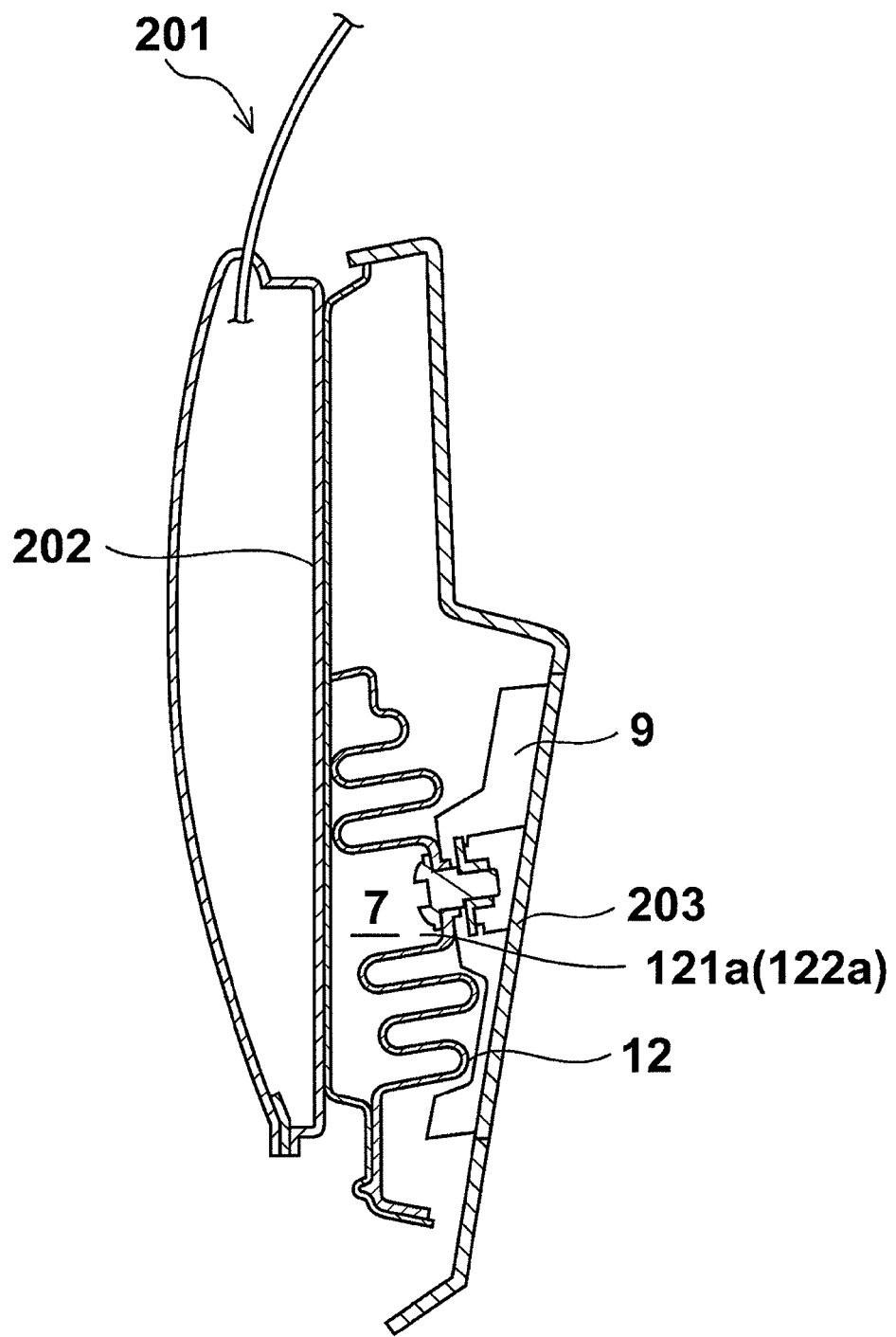
FIG. 36 is a sectional view of the vehicle door shown in FIG. 35.

Next, a device for protecting an occupant at the time of side collision which uses the air-bag device according to any one of the first to seventh embodiments of the present invention will be described with reference to FIGS. 35 and 36.

In this embodiment, the air-bag device 7 is placed on a surface of an inner panel 202 of a door 201 which faces vehicle interior and between the inner panel 202 and a door trim 203 with the outer cover 9 disposed in the vicinity of a back surface of the door trim 203. When the air-bag device 7 is expanded at the time of vehicle side collision, the outer cover 9 pushes the door trim 203 toward the vehicle interior to leave a space between an occupant and the door 201, thereby protecting the occupant.

In this embodiment, since the air-bag device 7 provided with a plurality of the cylinders 12 operated on a time lag or virtually at the same time is employed, the door trim 203 is not moved to excess toward the vehicle interior. Further, timing of expansion of the air-bag device 7 can be adjusted by means of the plurality of cylinders 12 operated on the time lag or virtually at the same time. Accordingly, improvement is made in degree of freedom of timing control of expansion of the air-bag device 7 in relation to advancing speed of the door trim 203 moved toward the vehicle interior at the time of expansion of the air-bag device 7. By the impact absorbing action of a front cylinder 121*a* and a rear cylinder 122*a* in the aggregate at the time of collision, an ensured protection can be attained.

In particular, when a vehicle is subjected to impact by side collision, since a large intermediate area such as an engine room is not present, the impact is instantaneously transmitted. To cope with this, an air-bag device is required to be capable of operating instantaneously.

In the air-bag device 7 used in this embodiment, the plurality of cylinders 12 each having a small volume are cooperatively operated on the time lag or virtually at the same time to give rise to rapid responding action. Accordingly, the air-bag device 7 is capable of surely holding and thereby protecting an occupant even in side collision.

Figure 37:
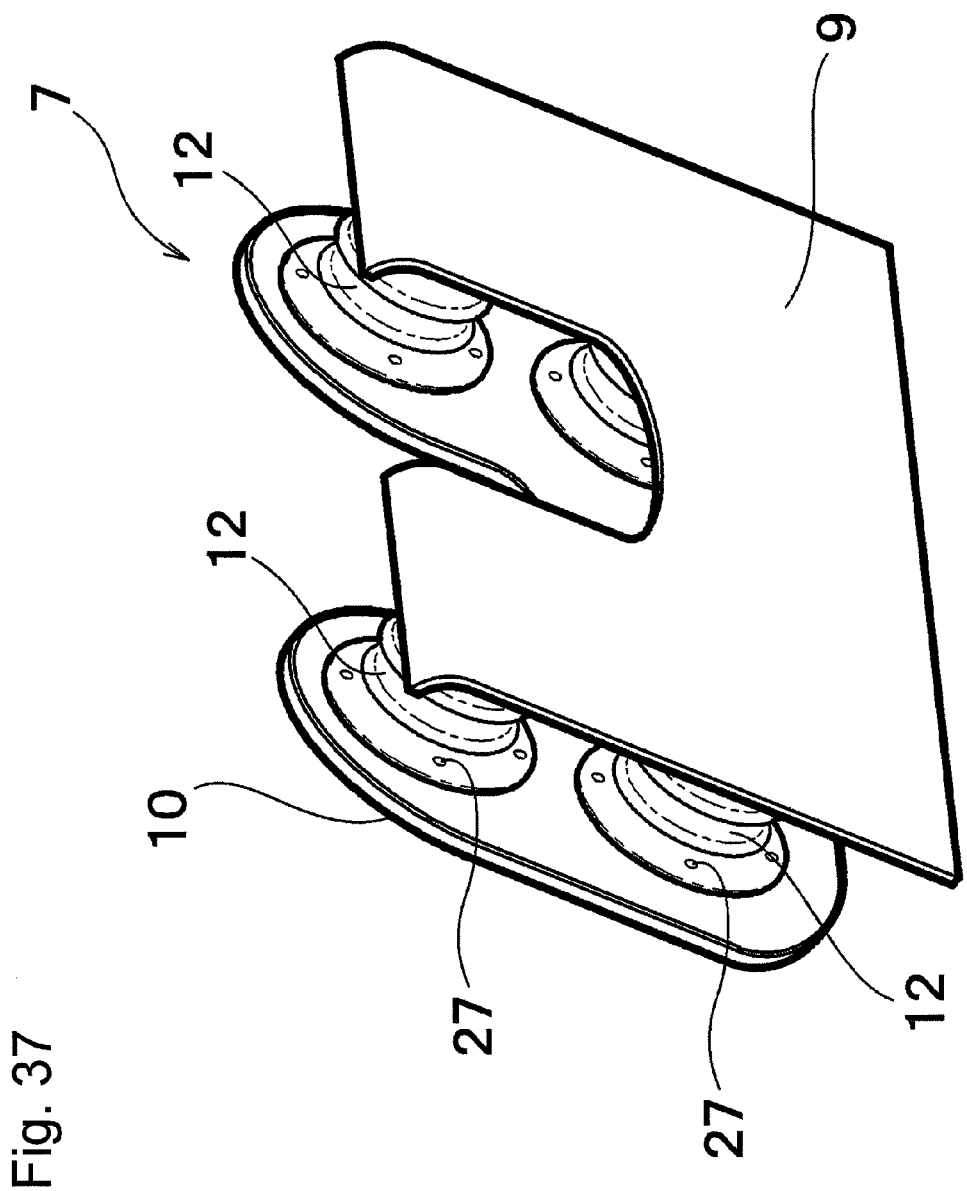
FIG. 37 is a partial exploded perspective view of the air-bag device of the present invention according to an eighth embodiment.

Then, an air-bag device of an eighth embodiment of the present invention will be described with reference to FIG. 37.

In the air-bag device of the eighth embodiment of the present invention, a plurality of low-volume cylinders 12 of the air-bag device 7 are prepared by blow molding in such a manner that molten impact absorbing plastic or molten plastic is formed into a tubular shape and placed in a cavity of a mold, and compressed air is supplied to the tube to expand the tube in the mold, thereby effecting molding.

In the case where the cylinders 12 are prepared by blow molding, a body of an air-bag inner 10 is molded alone separately from the cylinders 12. Separately from the body of the air-bag inner 10, according to specifications, lightweight cylinders 12 of various sizes and shapes are produced inexpensively and efficiently at high speed. The body of the air-bag inner 10 may be used in combination with any of the lightweight cylinders 12 of various sizes and shapes.

The cylinders 12 are attached to the standardized body of the air-bag inner 10 via connections 37 capable of ensuring high air-tightness to thereby enable the lightweight air-bag device 7 to be produced inexpensively and efficiently at high speed.

In the air-bag device and the vehicle occupant's lower limb protecting device according to any of the above-described embodiments, lower limb holding positions of the right and left upper cylinders 121, 121 and the right and left lower cylinders 122, 122 are set such that all the cylinders 12 have substantially the same energy absorbing capacities. However, according to posture and physical build of an occupant, a configurational angle of a seat and the like, the lower limb holding positions of the right and left upper cylinders 121, 121 and the right and left lower cylinders 122, 122 may be different from the above-described positions.

It should further be apparent to those skilled in the art that various changes in form and detail of the invention as shown and described above may be made. It is intended that such changes be included within the spirit and scope of the claims appended hereto.

This application claims priority from Japanese Patent Application No. 2009-167391 filed Jul. 16, 2009 and from Japanese Patent Application No. 2009-258670 filed Nov. 12, 2009, the above-noted applications incorporated herein by reference in their entirety.

What is claimed is:

1. An air-bag device comprising:
   an air-bag inner;
   an outer cover attached to the air-bag inner;
   an inflator case to which the air-bag inner is attached; and
   an inflator for supplying gas to a hermetically sealed space defined by the air-bag inner and the inflator case;
   the air-bag inner being provided with a plurality of folded cylinders;
   the cylinders having their leading ends attached to the outer cover;
   the outer cover being moved in the direction in which the cylinders impact-absorbably expands by gas supplied from the inflator.

2. The air-bag device according to claim 1, wherein the inflator for supplying gas to the hermetically sealed space to expand the folded cylinders is accommodated in the hermetically sealed space.

3. The air-bag device according to claim 2, wherein a first gas flow path for supplying gas supplied from the inflator to a cylinder or a group of cylinders and a second gas flow path for supplying gas supplied from the inflator to another cylinder or another group of cylinders are formed, and a gas flow regulating wall is formed which prevent gas from flowing from the first gas flow path into the second gas flow path until a gas pressure supplied from the inflator enables gas to flow from the first gas flow path into the second gas flow path.

4. The air-bag device according to claim 3, wherein the cylinder or the group of cylinders are an upper cylinder or upper cylinders and the other cylinder or the other group of cylinders are a lower cylinder or lower cylinders, and the upper cylinder or upper cylinders are designed to expand in advance of the lower cylinder or lower cylinders.

5. The air-bag device according to claim 1, comprising:
   a plurality of air-bag inners; and
   an inflator case having a plurality of inflator case side sections which correspond to the air-bag inners and an inflator case center section integrally formed with the inflator case side sections;
   the air-bag inners being attached to the corresponding inflator case side sections;
   the inflator case center section being attached with an inflator plate made of a metal to define a hermetically sealed space by the air-bag inners, the inflator case and the inflator plate.

6. The air-bag device according to claim 5, wherein the air-bag inners are a pair of air-bag inners, and the inflator case has a pair of inflator case side sections corresponding to the pair of air-bag inners.

7. The air-bag device according to claim 5, wherein the inflator is mounted in an inflator mounting cavity formed in the inflator case center section with one end portion of the inflator protruding to the outside of the hermetically sealed space.

8. The air-bag device according to claim 5, the air-bag device further comprising metal rings each having substantially the same shape as the contour of the air-bag inner and each having insertion holes for inserting the cylinders of each of the air-bag inners;
   each of the rings being disposed in such a manner that the corresponding air-bag inner and the corresponding inflator case side section and the ring are combined together with the air-bag inner held between the inflator case side section and the ring.

9. The air-bag device according to claim 5, wherein each of the inflator case side sections is formed with a plurality of gas flow paths in communication with the cylinders, and the gas flow path formed in the inflator case center section is in communication with the gas flow paths formed in the inflator case side sections.

10. The air-bag device according to claim 9, wherein the gas flow paths formed in each of the inflator case side sections are a first gas flow path or a group of first gas flow paths in communication with a cylinder or a group of cylinders and a second gas flow path or a group of second gas flow paths in communication with another cylinder or another group of cylinders.

11. The air-bag device according to claim 10, wherein the first gas flow path has a cross-sectional area larger than that of the second gas flow path.

12. The air-bag device according to claim 1, wherein orifice plates are interposed between the inflator case and the air-bag inner or air-bag inners.

13. The air-bag device according to claim 1, wherein the leading end of each of the cylinders is fixedly attached to the outer cover with a plastic pin.

14. The air-bag device according to claim 1, wherein the plastic pin has a tip and a collapse preventing wall integrally formed with the tip and diameter-expanded from the base end of the tip.

15. The air-bag device according to claim 14, wherein the tip of the plastic pin is fitted to an outer cover connection by applying a joint having a rotational axis to the tip of the plastic pin and fitting the rotational axis of the joint to the outer cover.

16. The air-bag device according to claim 15, wherein the rotational axis is disposed such that Z direction, i.e., the axial direction thereof, is perpendicular to X and Y directions, respectively; X direction representing a traveling direction of a vehicle body provided with the air-bag device and Y direction representing the vertical direction of the vehicle body perpendicular to X direction.

17. The air-bag device according to claim 13, wherein in a connection of the outer cover, a bearing portion is formed integral with the outer cover and a stopper is provided; thereby the rotational axis is disposed in a bearing formed by the bearing portion and the stopper.

18. The air-bag device according to claim 17, wherein the bearing for the rotational axis is elliptical in cross section.

19. The air-bag device according to claim 1, wherein the outer cover has such a laminated structure that a plastic panel is fixedly attached to a front surface of the outer cover and/or a metal plate is fixedly attached to a rear back surface of the outer cover.

20. The air-bag device according to claim 1, wherein a seal structure is formed in a joint area of the air-bag inner and the inflator case.

21. The air-bag device according to claim 1, wherein each air-bag inner and/or the cylinders are made of a plastic, an elastomer (TPO) or a rubber.

22. The air-bag device according to claim 1, wherein the cylinders are made of an impact absorbing plastic showing 20% to 50% of elongation in an environment of −30° C.

23. The air-bag device according to claim 21, wherein the cylinders are integrally formed with a body of the air-bag inner by injection molding.

24. The air-bag device according to claim 21, wherein the cylinders are molded by blow molding.

25. An vehicle occupant's lower limb protecting device comprising:
   the air-bag device according to claim 1 of which the outer cover is located in an instrument panel of a vehicle body;
   wherein a direction toward a predetermined position of knees of an occupant sitting on a seat in a vehicle is set as the direction in which the cylinders impact-absorbably expand.

26. A device for protecting an occupant at the time of vehicle side collision comprising:
   the air-bag device according to claim 1;
   the air-bag device being disposed between a door and door trim of the vehicle body;
   the outer cover of the air-bag device being disposed in the vicinity of the door trim.

* * * * *